April 8, 1952 G. H. KENDALL 2,592,157
AUTOMATIC GAUGING AND ASSORTING DEVICE
Filed May 10, 1946 20 Sheets-Sheet 1

INVENTOR
George H. Kendall
BY
ATTORNEYS.

April 8, 1952  G. H. KENDALL  2,592,157
AUTOMATIC GAUGING AND ASSORTING DEVICE
Filed May 10, 1946  20 Sheets-Sheet 3

INVENTOR
George H. Kendall
BY
Wooster & Davis
ATTORNEYS.

April 8, 1952 G. H. KENDALL 2,592,157
AUTOMATIC GAUGING AND ASSORTING DEVICE
Filed May 10, 1946 20 Sheets-Sheet 5
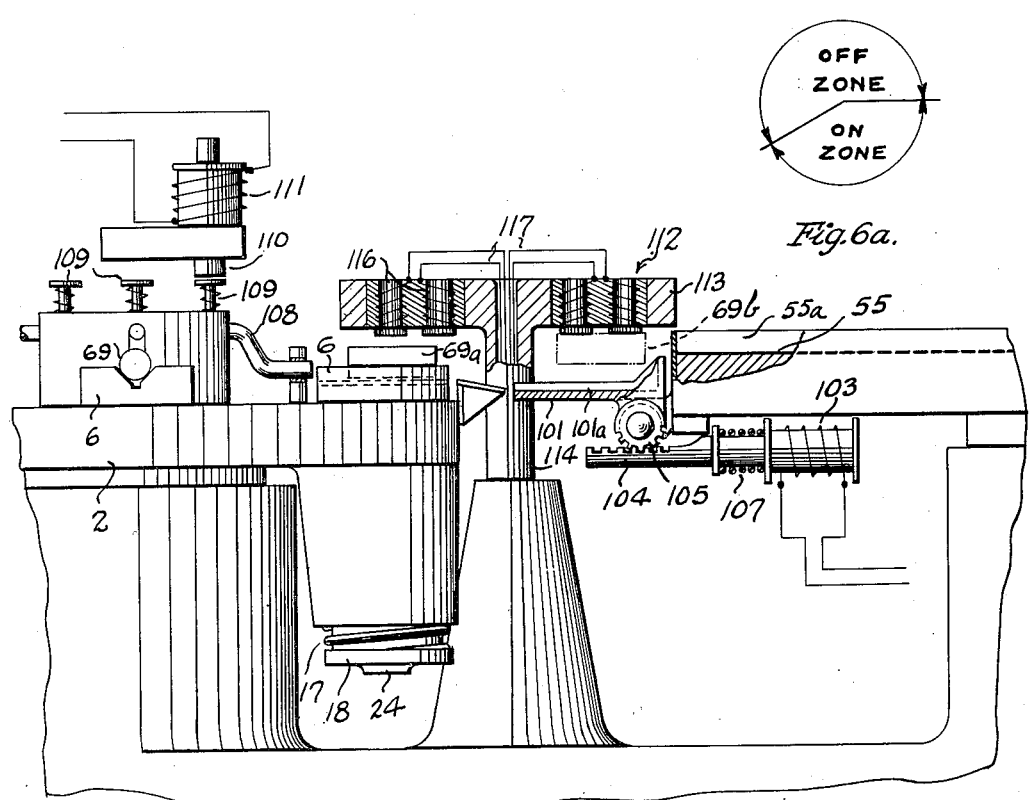
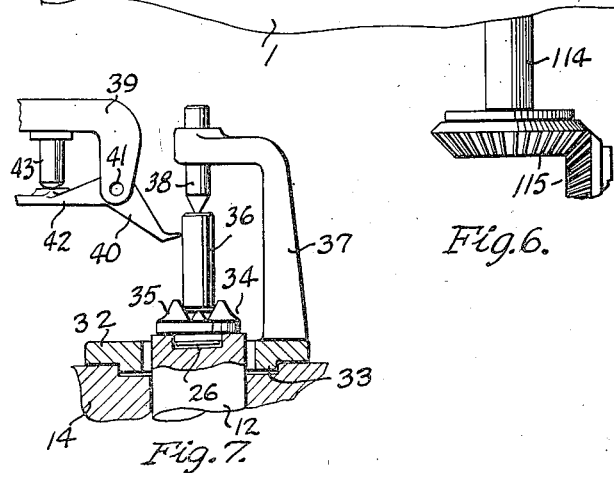
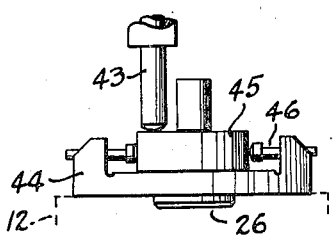
INVENTOR
George H. Kendall
BY
Wooster & Davis
ATTORNEYS.

April 8, 1952 G. H. KENDALL 2,592,157
AUTOMATIC GAUGING AND ASSORTING DEVICE
Filed May 10, 1946 20 Sheets-Sheet 8

INVENTOR
George H. Kendall
BY
Wooster Davis
ATTORNEYS.

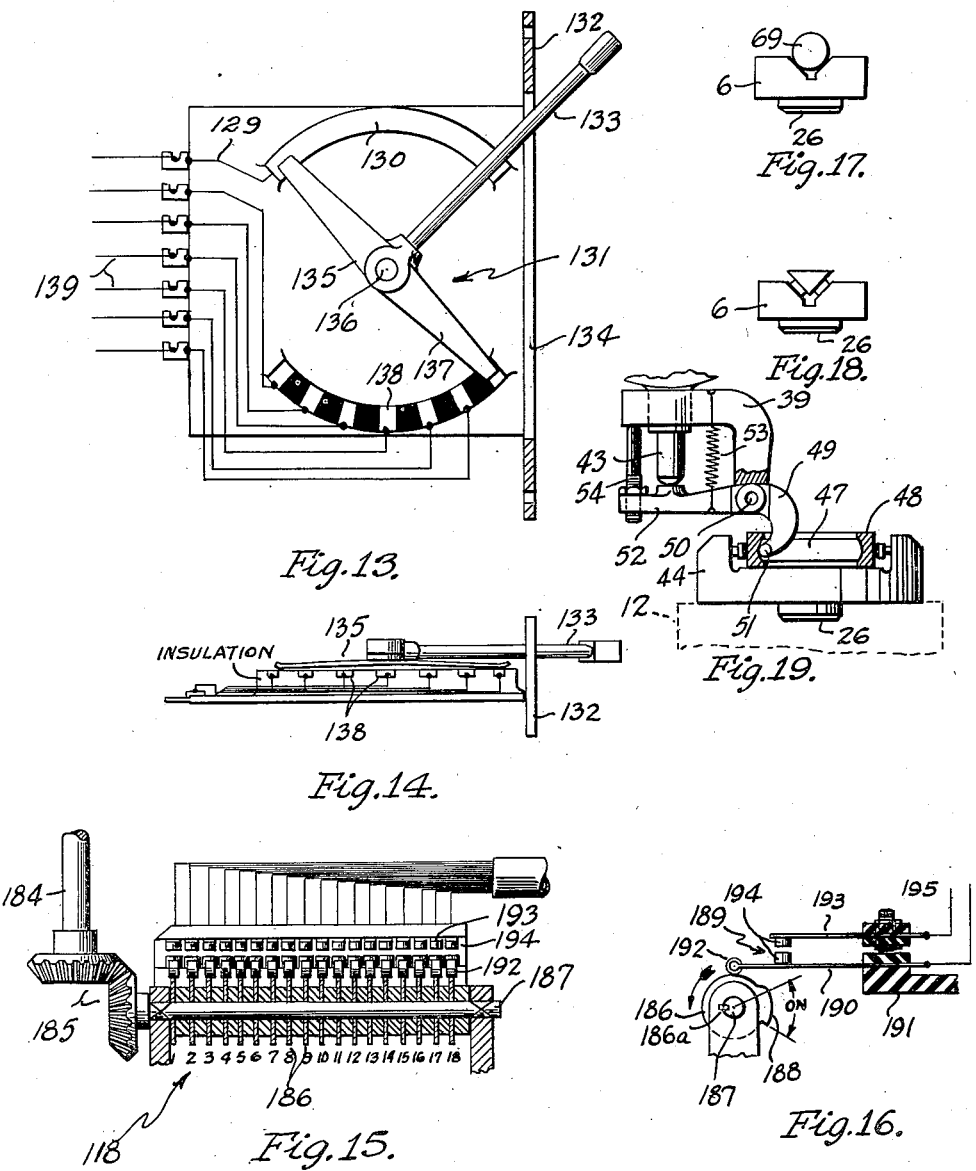

April 8, 1952 G. H. KENDALL 2,592,157
AUTOMATIC GAUGING AND ASSORTING DEVICE
Filed May 10, 1946 20 Sheets-Sheet 10
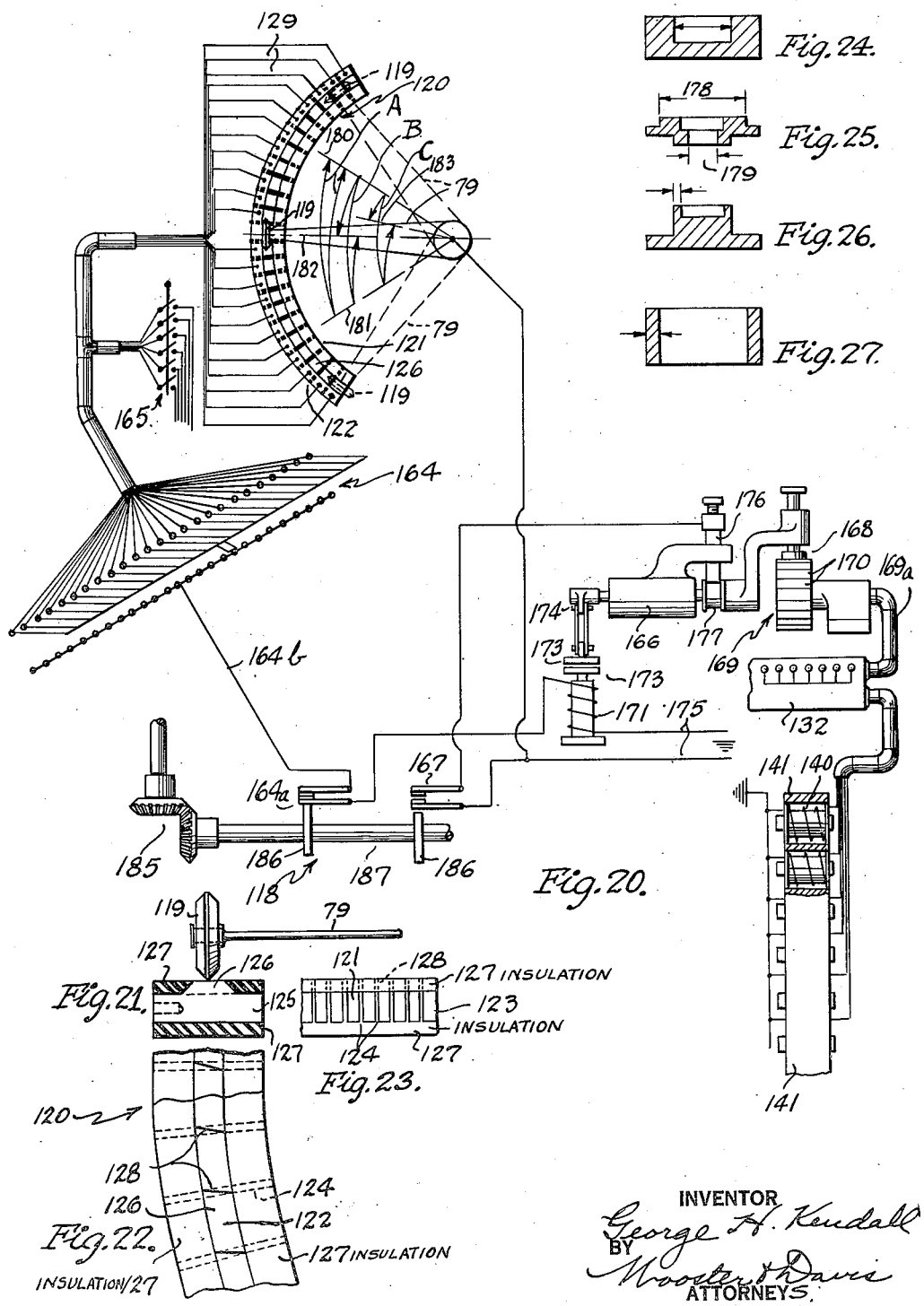

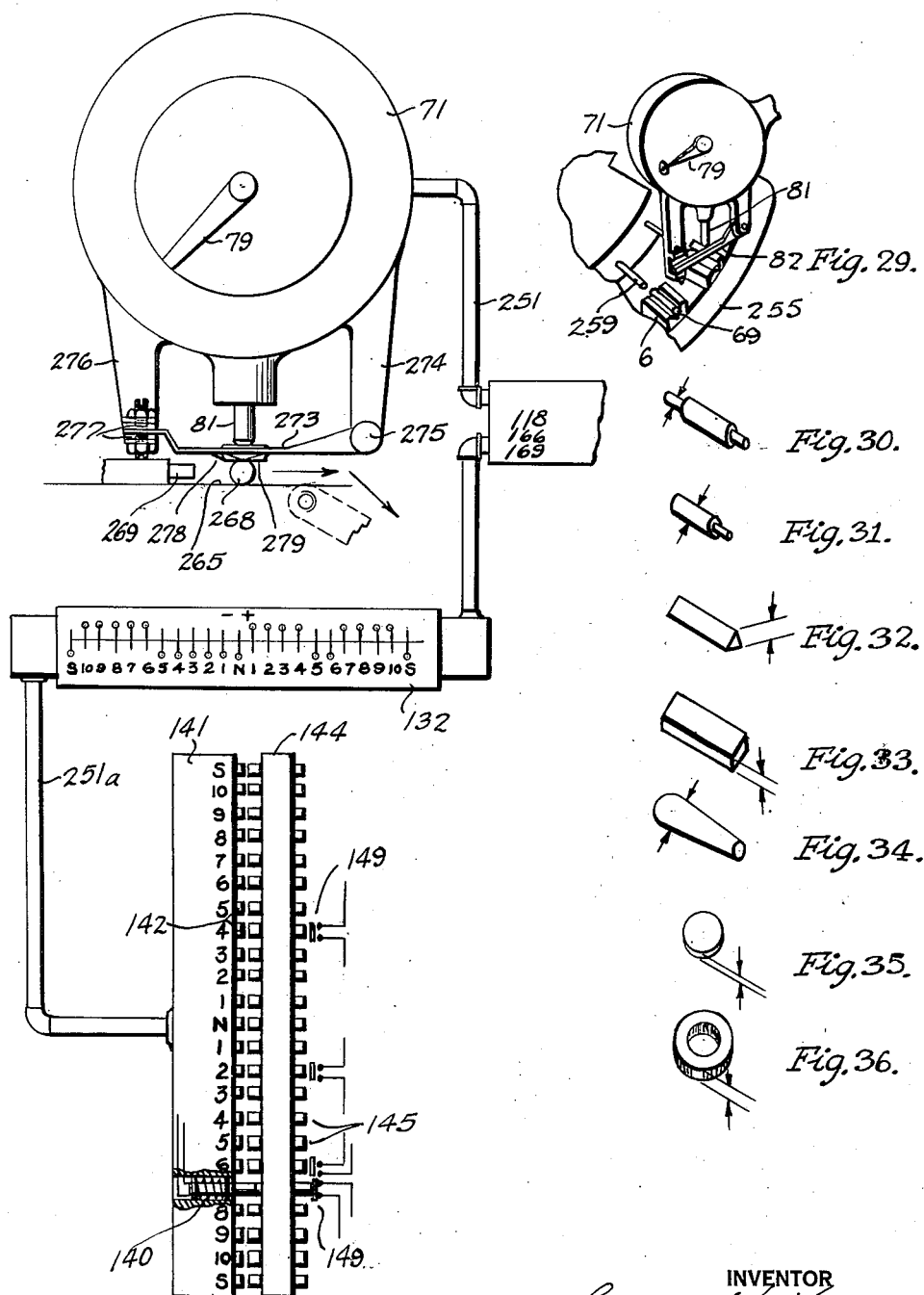

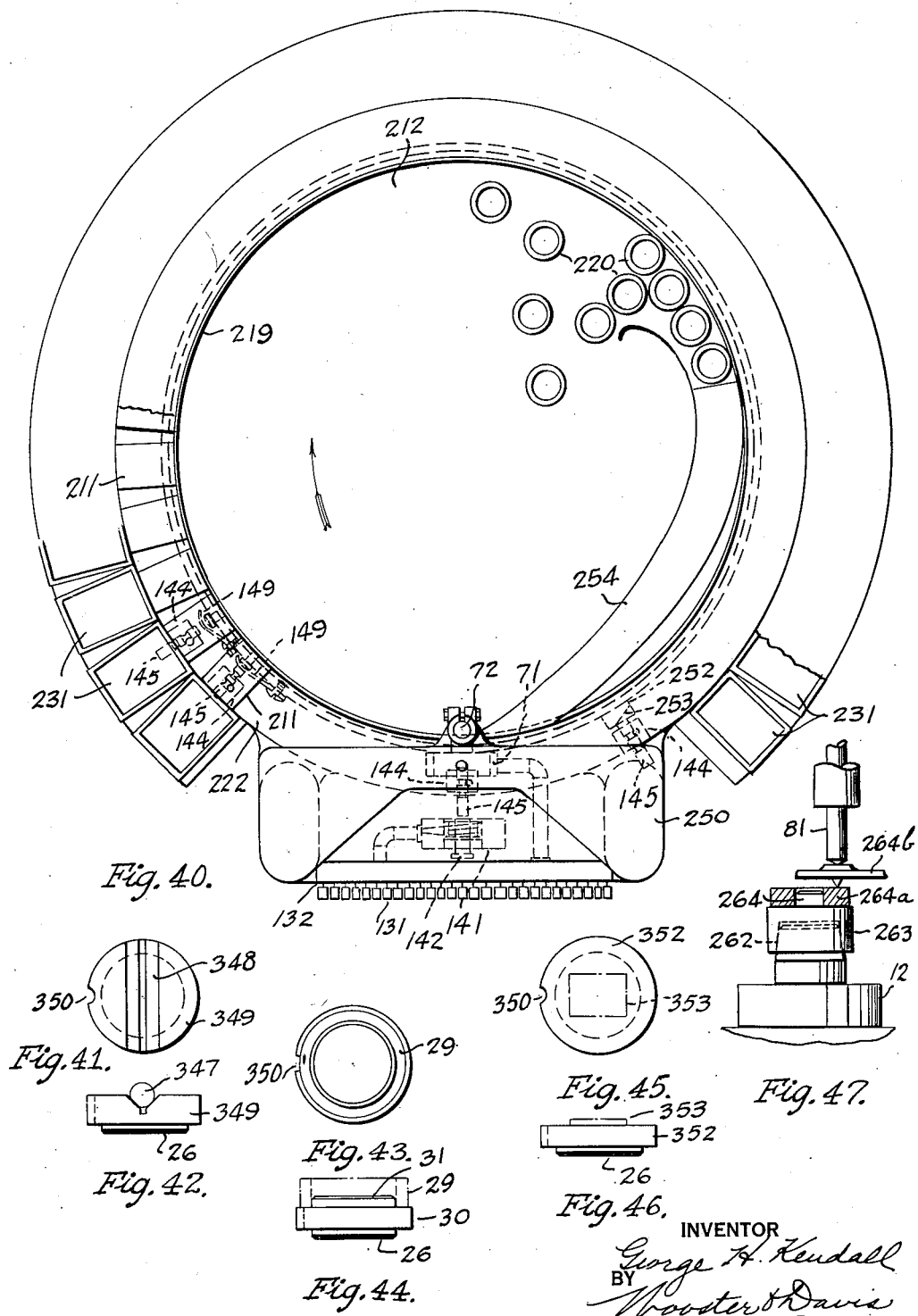

April 8, 1952 G. H. KENDALL 2,592,157
AUTOMATIC GAUGING AND ASSORTING DEVICE
Filed May 10, 1946 20 Sheets-Sheet 15
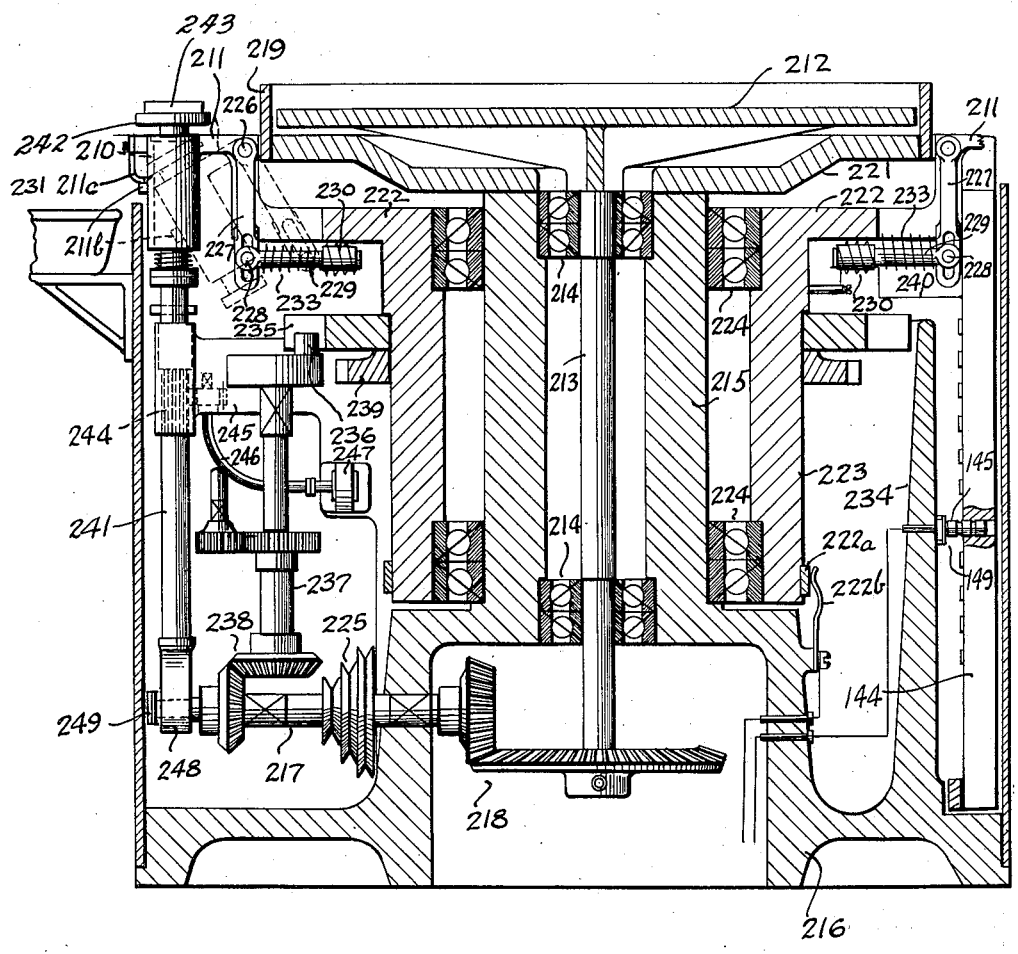

April 8, 1952 G. H. KENDALL 2,592,157
AUTOMATIC GAUGING AND ASSORTING DEVICE
Filed May 10, 1946 20 Sheets-Sheet 16

INVENTOR
George H. Kendall
BY
Wooster & Davis
ATTORNEYS.

April 8, 1952 G. H. KENDALL 2,592,157
AUTOMATIC GAUGING AND ASSORTING DEVICE
Filed May 10, 1946 20 Sheets-Sheet 17

INVENTOR
George H. Kendall
BY
Wooster & Davis
ATTORNEYS.

April 8, 1952 G. H. KENDALL 2,592,157
AUTOMATIC GAUGING AND ASSORTING DEVICE
Filed May 10, 1946 20 Sheets-Sheet 18

INVENTOR
George H. Kendall
BY
Wooster & Davis
ATTORNEYS.

April 8, 1952     G. H. KENDALL     2,592,157
AUTOMATIC GAUGING AND ASSORTING DEVICE
Filed May 10, 1946     20 Sheets-Sheet 20
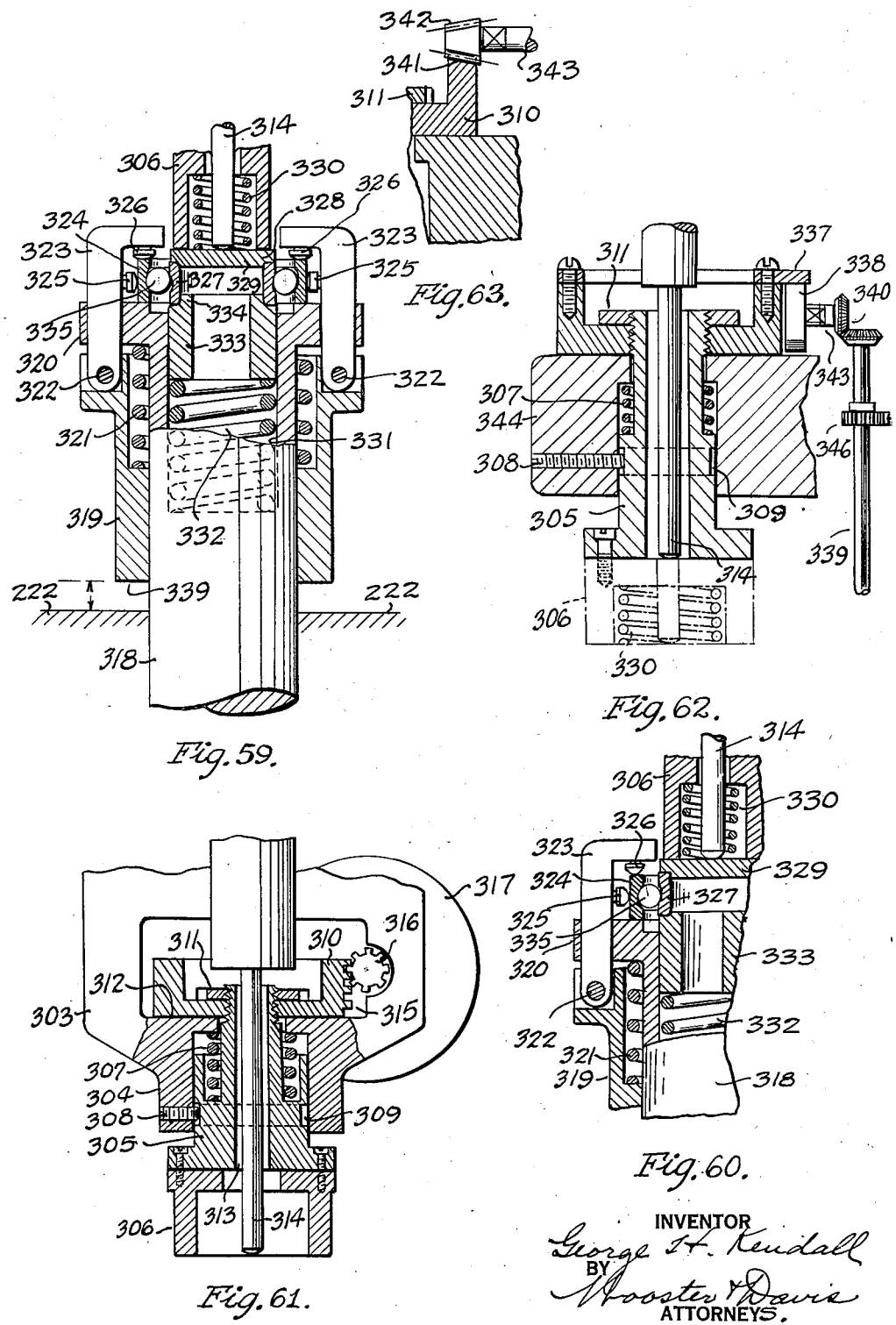

Patented Apr. 8, 1952

2,592,157

UNITED STATES PATENT OFFICE 2,592,157

AUTOMATIC GAUGING AND ASSORTING DEVICE

George H. Kendall, Noroton Heights, Conn.

Application May 10, 1946, Serial No. 668,818

20 Claims. (Cl. 209—88)

This invention relates to an automatic measuring machine, particularly a machine for automatically measuring manufactured articles and automatically separating them into different groups according to measurements within different determined limits, so that the articles can be used in the selective assembly method of manufacture.

In modern quantity production manufacture the quality control engineer has two basic methods of size control.

The first method is known as the "Tolerance Control Method" which provides means of measuring size within limits of the tolerance set by a given specification. The measurements are by tolerance range rather than exact size, such as "oversize," "within tolerance," and "undersize." In no instance does this method indicate by exact size how much variation there is. This method has been used more generally for general production inspection application.

The second method is known as the "Increment Control and Sorting Method," which determines the exact size of each part measured and sorts it into receptacles or groups of a given size. This is the more modern method, and it provides a satisfactory and economical solution for the "Selective Assembly Method of Manufacture" now so vital to economical mass production in precision industries where extremely close sizes must be strictly held. For a clear understanding of this invention and its objects it is essential to understand the Selective Assembly Method of Manufacture.

Large quantity production manufacture has reached such a high level of market requirements of its products, in rigid specifications for vibration, quietness control, uniformity and exceptionally close operating tolerances between relatively rotating or moving parts, that the working range for size of the tolerance has become less than can be held on machines at the necessary high rates of modern production.

Manufacturers, particularly during the last ten years, have been faced with the serious problem of rebuilding their shop equipment to permit holding of much closer machining limits; of ordering of new precision equipment; of much more frequent "shopping" or "take-up-of-play" periods in these machines to maintain the rigid degree of accuracy; or of greatly slowing down their rates of production per machine (to endeavor to hold closer accuracy) with a resulting greatly increased cost of manufacture per piece produced.

It will be clear that such tolerances are next to impossible for high production rate shops, as there are no machine tools in existence capable of consistently holding such tolerances in production.

To efficiently and most effectively solve this serious situation a method was created, known as the "Selective Assembly Method of Manufacture." This consisted of the principle of opening up the machining tolerances on each dimension of the part being machined (from, say .0002 to .0005 inch, to .002 to .003 inch, for example) and arranging the tolerances on shaft and bushing so that they overlap. That is, when assembled, the smaller shafts would do in the smaller bushings and the larger shafts in the larger bushings. Going further in the creation of this method, the idea was conceived of measuring each part by hand and assorting them to .0001 inch increments within the greater machining tolerances. This was so that the parts could be selected by their graded increment and assembled with the exact ideal minutely close operating tolerance initially specified by the design engineer for the rigid quietness control or other exacting rigid requirement. It would then be possible to match up the entire lot of parts as produced by the shop, with the result that practically all could be assembled to the ideal rigid specifications, instead of there being only of about 60 to 70 per cent possible, as was the case in former manufacture. With this method the production shop is, therefore, able to produce at the very highest rates of production, and it is able to supply the finished product with rigid uniformity to the highest exacting standards of design requirements to meet sales and merchandising demands of competition.

Modern manufacture in various lines of industry requires the "Increment Control and Sorting Method" for all types of measuring, whether for outside diameters, inside diameters, or any other machined dimensions. It is further desirable for a successful machine that it be fully capable of being changed from one type of measurement to another type quickly, to permit the handling of short runs effectively.

It is therefore an object of this invention to provide an automatic measuring machine for the exact measurement by increments and sorting of parts as a result thereof, for the solution of the automatic selection of parts in production assembly for the "Selective Assembly Method of Manufacture."

It is also an object of the invention to provide an automatic measuring machine which will be capable of making many types of measurements to enable any shop to use it if desired for short runs on many different applications.

It is another object of the invention to provide an automatic measuring machine which may not only be used for many different measurements, but may be changed from one measurement to another within a few minutes time, to assure full flexibility of general purpose use.

Another object is to produce a measuring machine in which various types of gauging heads for determining the measurements of the article being measured may be used, and then to transmit a signal of the increment sizes to an automatic sorting mechanism.

It is another object of the invention to provide an automatic measuring machine in which the functions of hopper feed measurement and sorting, although mutually dependent upon and cooperating with each other for the complete measuring and sorting operation, are sufficiently distinct and complete within themselves for low cost quantity production, and enable the units to be assembled to produce different capacity machines.

It is another object of the invention to provide a machine capable of a series of motions to enable a single machine to make all types of different measurements, and to be quickly interchangeable from one to another.

It is an important object of the invention to provide a common vehicle or work holder to support the various different kinds of parts to be measured and assure there is for each a common zero point in relation to the measuring gauge, to secure the greatest degree of precision accuracy and to enable rapid change for measurement of other type parts with the same or other work holders.

A further object is to provide an electrical type of control employing increment circuit wires from the gauging head with multiple point circuit switches, to make possible any increment or group selection sorting, without requiring any other movement or change than the moving of the switches from one series of points to another series manually.

It is a further important object to provide the gauging head increment circuits with another switch control, permitting increment additive types of measurement to be immediately recorded, without other change than moving one switch from one means of measurement to another.

It is a particular purpose to provide a rotary type of sorting table so arranged that the sorting signals may be given to an increment selecting strip on the table, to later become effective in a given position of the table to deposit the measured part in its proper increment box, so that there is permitted immediate measurement of a succeeding part without waiting for the sorting mechanism to deposit the gauged part in its increment box before making the measurement on the succeeding part, and thus secure the most rapid rate of measurement.

It is a further object to provide an automatic measurement machine for general purpose use which is capable of accurately measuring parts in increments of as small as .0001 inch magnitude with the rigidly uniform result and the rapid operation required in mass production.

It is another object to provide an automatic measurement machine that will measure either inch, millimeter or other increments or fraction thereof without any other change than change of the electric or electronic gauge head.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

Fig. 3a is a side elevation of one type of a work piece support showing a work piece in section thereon;

Fig. 3b is a perspective view of a portion of the spacer and one form of work support which may be used on the rotating turret;

Fig. 6 is a partial side elevation and partial section of a portion of the work turret, the feeding and sorting table and the transfer mechanism between them;

Fig. 6a is a diagram showing operation of the transfer device;

Fig. 7 is a partial side elevation and partial section showing the method of gauging a cylindrical part for out-of-roundness;

Fig. 8 is a side elevation of a work holder and work piece showing the method of gauging shoulder parallelism;

Fig. 13 is a side elevation of one of the increment switches in the main control panel;

Fig. 14 is a bottom plan view thereof;

Fig. 15 is a partial section and partial side elevation of the sequence timer switches;

Fig. 16 is a view of one of the switches looking from the right of Fig. 15;

Fig. 17 is an end view of a work piece supporting block showing one type of work piece supported therein;

Fig. 18 is a similar view showing another type of work piece supported therein;

Fig. 19 is a side elevation of the work support and a gauging means showing the method of gauging for size or eccentricity of an internal shape, the work piece being shown in section;

Fig. 20 is a diagrammatical view and wiring diagram for the additive type of measurement;

Fig. 21 is a detail section through the contact ring of the form of gauge used in Fig. 20;

Fig. 22 is a top plan view of a portion thereof;

Fig. 23 is an edge view from the right of Fig. 21;

Figs. 24 to 27 are cross sections of various types of work pieces indicating various dimensions which may be gauged on this machine;

Fig. 28 is a diagrammatic view showing the connection of the gauge to the setting up or selective sorting strip through the main control panel;

Fig. 29 is a perspective view of the gauge and a portion of the turrent holding the work pieces;

Figs. 30 to 36 are perspective views of various forms of work pieces, indicating measurements that may be gauged on this machine;

Fig. 40 is a top plan view of the device of Fig. 38;

Figs. 41 and 42 are a top plan and side elevation respectively of one form of work holding block;

Figs. 43 and 44 are similar view of another type of block for holding a different type of work piece;

Figs. 45 and 46 are similar views of a block for another type of work piece;

Fig. 47 is a partial side elevation and partial section of the work holding spindle and block for rotating a work piece, indicating how it may be gauged for thickness;

Fig. 48 is a sectional elevational view through the sorting and feed tables of Fig. 40;

Fig. 48a shows in side elevation another form of work support which may be used with this table;

Fig. 59 is a sectional elevational view through the holding and gauging means for gauging lateral play in an assembled structure as, for example, a ball bearing assembly;

Fig. 60 is a sectional elevational view of a portion of Fig. 59 showing the assembly being gauged in another position;

Fig. 61 is a similar view of the upper mechanism used with that of Fig. 59;

Fig. 62 is a section through a part of the gauging and holding means which may be used for the operation of the device of Fig. 59, and Fig. 63 shows a slight modification of the arrangement of Fig. 61.

Figure 1:
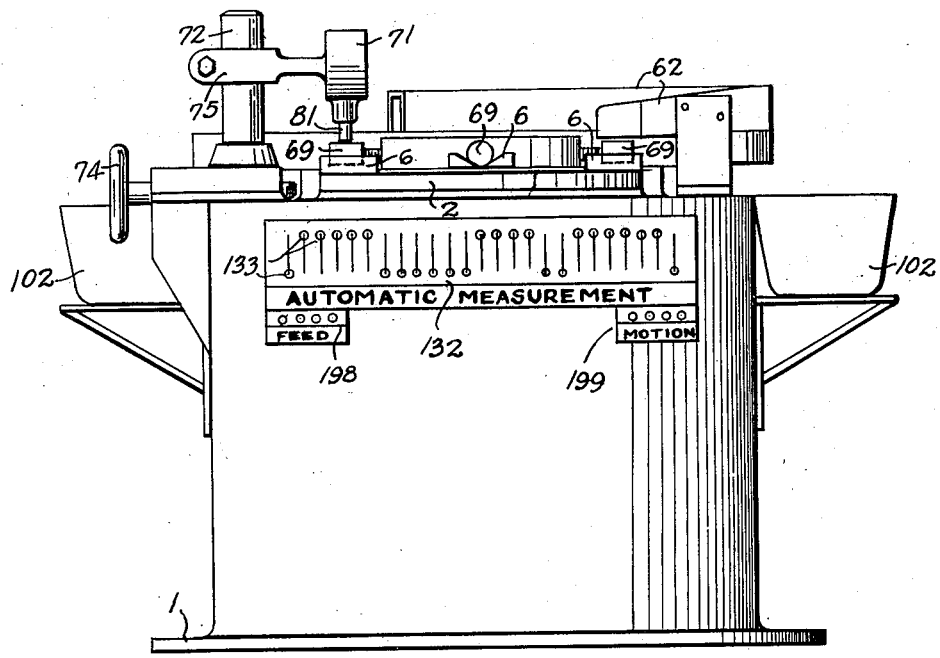
Fig. 1 is a front elevation of one type of machine.
Figure 2:
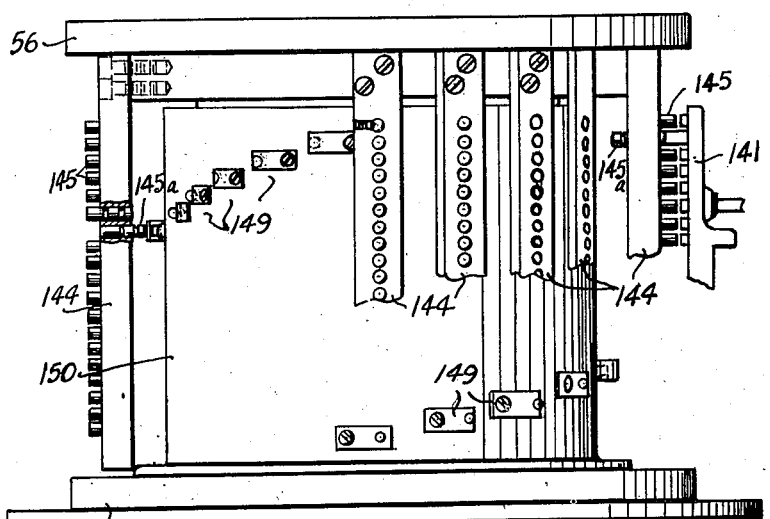
Fig. 2 is a side elevation of a portion of the sorting table showing the arrangement of the sorting strips and the cooperating sorting table designation locations.

This invention provides an automatic measurement machine for general purpose use which is capable of accurately measuring in increments of .0001" magnitude in a rigidly uniform and most rapid mass production manner. A short description of some of the principal types of measurements possible will illustrate the scope and intent of the invention and will clearly indicate how many thousands of measurements on various shaped parts may be successfully measured and sorted in regular mass production shop manufacture. The "eccentricity circuits" mentioned in the following are for the "additive type of measurement."

Some types of measurement and the manner in which the dimensions to be measured should be set up on the machine are noted briefly as follows:

Outside diameter:
    Set vertically on work holder.
Inside diameter:
    Set horizontally on work holder. Work station rises and lowers for the measurement.
Outside diameter groove:
    Set vertically on work holder at groove diameter.
Inside diameter groove:
    Set horizontally on work holder with groove type of gauge stem. Work station rises and lowers for the measurement of the groove.
Outside eccentricity:
    Set horizontally and center on work holder. Work station rotates once with the switch thrown to the eccentricity wiring circuits.
Inside eccentricity:
    Set horizontally and center on work holder. Work station rises, rotates once and lowers for measurement with switch thrown to the eccentricity wiring circuits.
Outside concentricity:
    Set and measure same as for outside eccentricity.
Inside concentricity:
    Set and measure same as for inside eccentricity.
Taper, round, flat or triangular shape:
    Set horizontally with corresponding taper on work holder surface at fixed shoulder position to provide definite distance on taper for measuring point.
Bore bellmouth or taper:
    Set vertically on work holder. Work station rises and lowers over range desired with switch thrown to eccentricity wiring circuits.
Curved contour:
    Set horizontally with corresponding contour on work holder and fixed shoulder position to provide definite distance on contour for measuring point.
Flat surfaces:
    Set horizontally or vertically on work holder.
Parallelism:
    Set horizontally on work holder. Work station rotates for measurement with switch thrown to eccentricity wiring circuits.

Axial play between assembled parts:
 Set horizontally on the axial play work holder. Work station rises and lowers with "A" collar preset to back away for measurement.

Out-of-roundness:
 Set horizontally, or vertically, on work holder and rotate once the work station with switch thrown to the eccentricity wiring circuits.

Outside runout of groove with face:
 Set horizontally on work holder. Work station to rotate once for measurement with switch thrown to the eccentricity wiring circuits.

Inside runout of groove with face:
 Set horizontally on work holder. Work station to rise, rotate once and lower for measurement with switch thrown to the eccentricity wiring circuits.

Length:
 Set vertically on work holder.

Width:
 Set vertically or horizontally on work holder.

Squareness of shoulder:
 Set vertically on work holder. Work station rotates once for measurement with switch thrown to the eccentricity wiring circuits.

All the above measurements include sorting and grading into the proper increment size box by the automatic measurement machine.

It is particularly pointed out that internal play within any assembled mechanism can be measured on this automatic measurement machine through use of work holder fixtures of the "axial play measurement type" described herein. That is a fixture permitting the internal play measurement of pre-assembled component parts; such as ball bearings, for example.

The important principles of such truly general purpose measurement are fully provided in the following basic functions of this invention and are the principles that are believed to be broadly and specifically new. A brief outline of them are as follows:

An automatic measurement machine having functions, for use singly or in combination, for the general purpose external or internal measuring of all shapes of parts in a machine of proper rigidity for the precision comparative automatic gauge measurement by increments and the selective sorting and grouping as desired thereof. It includes means for:

1. Continuously, by intermittent movement, bringing rigid precision work stations to the measurement location;
2. Work holders for quick change support for any shape part;
3. Holding part during measurement;
4. Ejecting part after measurement;
5. Automatic gauge measuring by increments with signal transmission to actuating means;
6. Gauging arm for assuring accurate size uniformity;
7. Gauge measuring and recording measured signals by increments for selective sorting;
8. Gauge measuring and recording measured signals by increments for selective grouping;
9. Elevating and lowering work station for part measurement;
10. Elevating and lowering work station during part measurement;
11. Rotating work station for part measurement;
12. Rotating work station during part measurement;
13. Elevating, rotating and lowering work station for and/or during part measurement;
14. Preloading assembled part for play measurement by work station with locating collar preset with gauge for common increment of measurement;
15. Continuously, by intermittent movement, removing rigid work stations from the measurement location.

One of the most vital basic principles of a truly practical and successful automatic measurement machine is provided in the invention of the work holder. This provides a common means, to all types of various shaped parts, of super-precision setting in place for accurate location with the precision electric or electronic gauge head. Without this work holder a machine would be a special purpose machine suitable only for use in measuring one shape or part and the machine could not be quickly changed from one part to another part to be measured. The invention of the work holder enables use of a piece that can be accurately made to fit on the machine measuring stations and one in which its upper sides may be accurately precision machined to fit the various shaped parts to be measured. A set of work holders, all exactly alike in minute precision accuracy, is made for each part to be measured on the automatic measurement machine. The work holder becomes the part for the art of design engineering of fixtures for measuring any particular piece on the automatic measurement machine. It may be compared in principle to the chuck in the engine lathe.

To assure full freedom for this invention of an automatic measurement machine these basic fundamental principles were provided to assure continuous uniform automatic measurement with minute precision accuracy.

*First.*—It is essential that automatic measurement have three basic elements each broadly entirely independent in function from the other, yet so designed as to perfectly blend in every operating function regardless of the machine model. The three elements would be the feed, measurement and sorting mechanisms.

*Second.*—The feed element must be capable of the delivery of one part, only at a time to continuous repeating stations of the machine as they appear at the loading position. The feed element may be of the hopper type, inclined chute, bin, rotary table with pusher or any other principle of feeding mechanism suitable to the particular shape of the parts to be delivered to the machine.

*Third.*—The automatic gauge element must accurately precision measure the part quickly and pass along the signal of its size increment and sorting bin designation as the continuously repeating stations pass before it. The gauge element must be capable in minute precision accuracy of providing the increment of size, whether inch, millimeter or other scale, or of the additive forms of increment measurement. The gauge element must also be capable in this signal of size, once given of being entirely free for providing the next size signal in the rapid quick measurement required of successful automatic measuring machines.

*Fourth.*—The sorting ejection element must be fully capable of taking the signals given by the gauge element and of freely sorting the parts and ejecting them into the proper size designation bins at the right location regardless of all of the other parts being measured, sorted and ejected similarly at the same, or approximately the same, moment of the individual station cycle of rotation.

This invention basically requires three fundamentals of design principles to fully assure positive freedom of automatic measurement at all times without interference of any of the cycle elements in any type of measurement being taken.

*First.*—A complete continuous power drive to rotate, index and properly time all mechanisms and circuits. It must drive the work station table and index its position, actuate the feed mechanism, rotate and actuate the sorting table and ejecting mechanism and drive the sequence timer for the exact precision timing of every electrical circuit on the entire machine.

*Second.*—A complete continuously functioning electrical gauge head wiring cable with gauging increment and sorting circuit control for full flexibility for any type of increment or additive measurement and transmission of its signals to the sorting designation mechanism. This cable mechanism to have manual selective switching for any desired type of measurement or group selections of parts being measured.

*Third.*—A complete work station to provide rigid precision accuracy and all motions where needed for every type of increment and increment additive measurement of the part being measured by the gauge element. The work station must function freely for any combination of motions to quickly allow changes from one to another measurement as various shaped parts are to be run on the machine.

Wtih these basic fundamentals established for the broad general application use of successful automatic measurement, the invention developed the following features of a truly general purpose automatic measurement machine.

For purposes of greatest clarity and simplicity in description of this machine, the illustrations are shown covering one mechanism or group of functions from a design principle standpoint to enable one to easily carry through the operational thought.

All types of precision gauge measurements performed on this machine are made in the fully established manner of accepted practice throughout the industrial world.

Referring first to Figs. 1 to 37, the machine comprises a rigid frame casting 1 which provides a base and support for the entire machine and assures the proper degree of precision accuracy is maintained through its operating life, and also during transportation from the point of manufacture to its operating location in the customer's shop. The mechanisms requiring extreme accuracy are grouped within the simple four station measuring table or turret, and in the means for mounting the gauging head, which are of designs which permit extreme accuracy in a practical manner.

All other parts of the machine do not require more than normal good machine shop practice accuracy, which assures low cost of manufacture of this automatic measurement machine in volume production.

The operation of the machine is based upon two main sections, the gauging or measurement section and the sorting section. The measurement or gauging section includes a measurement station, and the parts are brought to the measurement station on the measuring table or turret by any suitable type of feeding mechanism most suitable for the type of parts being run through the machine. The measured or gauged parts are then transferred to the sorting section and then distributed by this section to the correct compartments or containers, for parts corresponding to given measurements or dimensions. The measurement section includes a rotating measurement table or turret 2 mounted at the upper end of a hollow upright shaft 3 which is mounted on suitable antifriction preloaded bearings 4 on the central supporting column 5 which may be a part of the frame. The measuring table carries a plurality of article supports 6 for the articles to be measured, and the table is rotated with a step-by-step movement through a Geneva drive comprising the notched driven plate 7 and the driving pin 8 operated by any suitable drive mechanism, such as the bevelled gears 9 driven from the main drive shaft 10 in turn driven by any suitable power device, such as the electric motor 11.

There are four of these work holders 6 equally spaced on the table 2. They may be mounted directly on the table, but it is preferred that they be mounted on individually rotatable spindles 12 mounted on the measuring table and rotatable with it. These spindles for the work holders are rotatable for the purpose of measuring and gauging parts which must be rotated to make the measurements desired, as, for example, the part is turned once around for all forms of additive measurement of external or internal surfaces, for eccentricity, out-of-roundness, and so forth, as will be more fully described later. Also, means may be provided for raising and lowering these spindles with the work holder to raise the part to the proper relation to the stem of the gauging head for either internal or external measurement. These movements enable the taking of any type of measurement in the manner accepted by industry.

Figure 4:
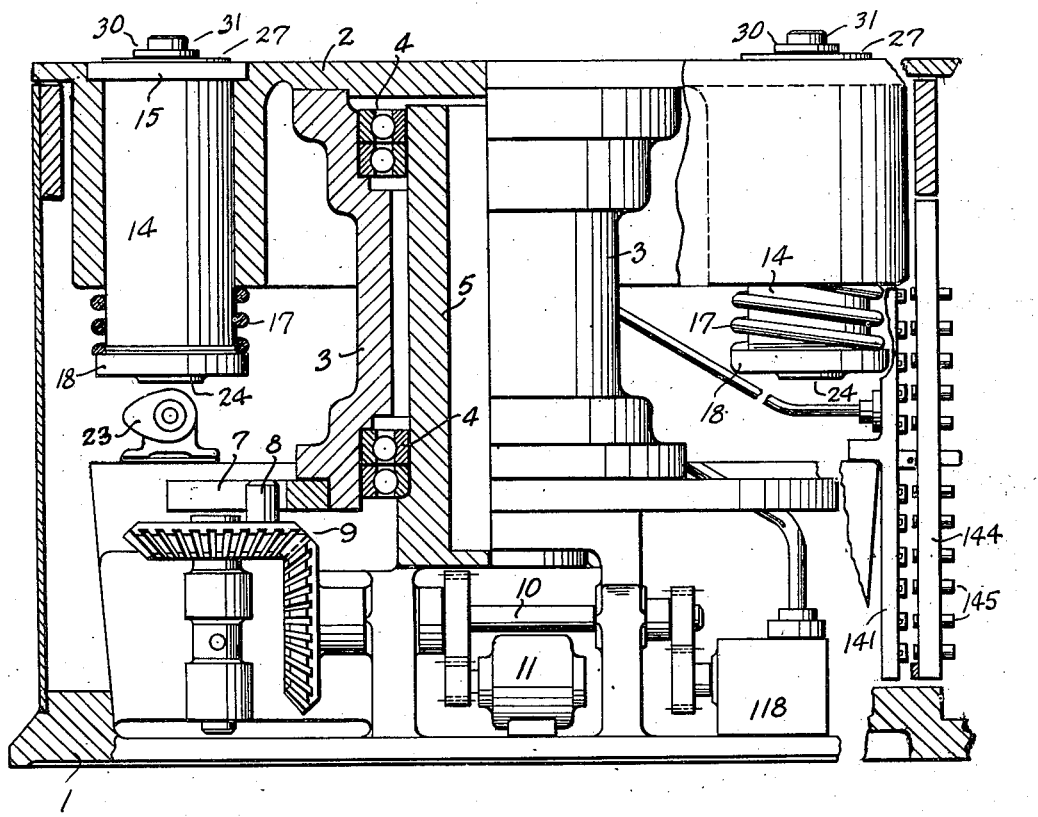
Fig. 4 is a partial side elevation and partial section of a rotating gauging turret showing the drive therefor.
Figure 5:
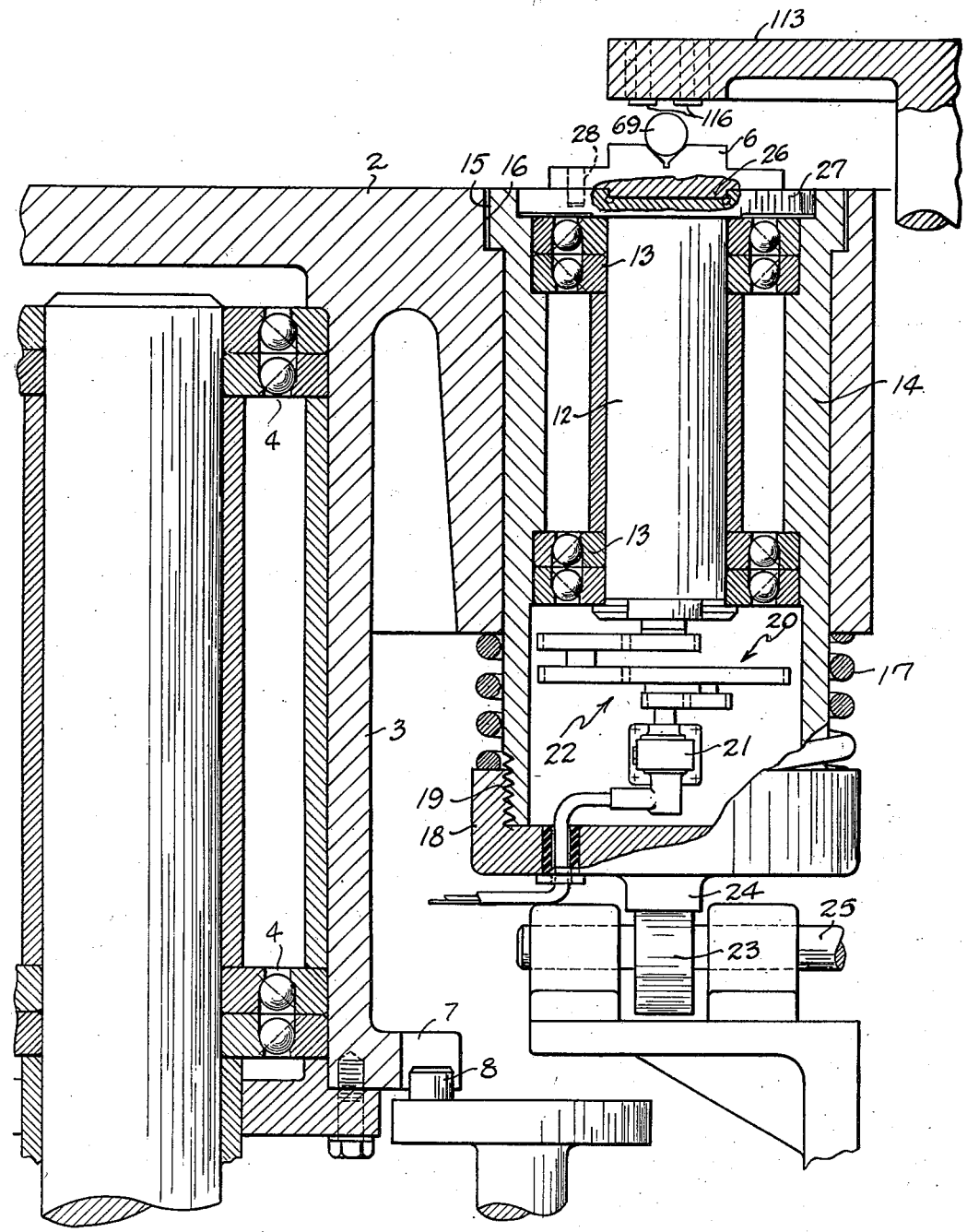
Fig. 5 is a section through a portion of the work turret and one of the spindles carrying the work holder.

The means for rotating and raising the spindle is shown in Figs. 4 and 5. As will be seen in these figures, the spindle 12 is mounted in prestressed ball bearings 13, which bearings are mounted in a sleeve 14 accurately fitted in the measuring table 2. The sleeve has a flange 15 at its upper end seating in a suitable recess 16 in the table, and a spring 17 embraces a lower end portion of the sleeve projecting below the underside of the table and located between this table and a cupped head 18 secured to the sleeve by any suitable means, such as the threads 19. This spring, therefore, tends to hold the sleeve in its lowermost position with the flange 15 seated in the recess 16 and the lower shoulder of the flange seating on the bottom of the recess.

As suggested, means is also provided for rotating spindle 12, usually a single revolution being required for a single gauging operation. For this purpose a gear motor, indicated as a whole by the numeral 20, is provided, in the arrangement shown comprising a small electric motor 21 connected to the spindle 12 by a reducing gear drive 22, the motor being operated from a suitable source of supply through proper controls, including a sequence timer, which will later be more fully described, the gear motor generally imparting a single revolution to the spindle and the work carried thereby, and then being stopped automatically.

For raising and lowering this spindle with the work piece, where it is desired to either lift the work piece to the proper gauging position with respect to the gauging stem, or to gauge longitudinal measurements, a cam 23 is provided under the lower end of the sleeve 14 adapted to lift the sleeve by lifting on the lug 24 on the bottom wall of the cap 18. This cam is mounted on a suitable shaft 25 driven from the main drive. It will be understood that in gauging certain work pieces it is not necessary or desirable to rotate the work holding spindle 12. Examples of such pieces are shown in Figs. 3b, 17, 18, and 29 to 34. Examples of where it may be desired to rotate the spindle and the work pieces are shown in Figs. 3, 3a, 19, 24 to 27, 35, and 36. For the type of article shown in Figs 3b, 17, 18, and 29 to 34, a V-block, such as that shown at 6 (Fig. 5) may be used, this block being accurately ground so that the surfaces are accurately positioned on the work spindle 12 and on the table 2 with respect to the gauging means, and for easy locating of this work holder or block it may have a projecting boss 26 on its lower side seating into a similarly shaped recess in the top flange 27 of the spindle 12, and to insure that it is properly angularly positioned, it may carry a locating pin 28 projecting from its lower edge and seating in a suitably positioned socket or recess drilled in the top of the flange 27.

For the type of work which is desired to be rotated, other types of work holders may be used, and it may be necessary to make special holders to fit the particular types of work piece and its particular size. For example, in Figs. 3, and 3a, where it is desired to gauge a circular member, such, for example, as a sleeve or ring 29, the work holder comprises the block 30 seating on the flange 27 of the spindle and held therein by a boss 26 on the lower side of the block, the same as for the V-shaped block 6, and provided on its top surface with another circular boss 31 to fit within the work piece 29 and accurately hold it in the gauging position.

Examples of holders of other types of work pieces to be gauged are shown in Figs. 7, 8 and 19. In Fig. 7, the holder comprises a base 32 provided with a boss 33 to seat in the top of the sleeve 14, and in this case the flange 27 would be removed from the spindle 12 and the upper end of the spindle extended through the base 32 and provided with a holder 34 having a boss 26 on its lower side seating in the recess in the end of the spindle to locate it, the same as other work holders, and this holder is provided with fingers 35 to receive and hold and center the lower end of the cylindrical work piece 36. Extending upwardly from the base 32 is an arm 37 carrying an adjustable center 38 to position the upper end of the work piece 36 and an arm 39 of the gauging head has a contact finger or feeler 40 pivoted at 41, the other arm 42 engaging under the gauging stem 43. Thus the gauging stem is positioned by the finger 40 engaging the work piece 36, and as the work piece 36 is rotated one revolution by the spindle 12 the work piece 36 is gauged for size, eccentricity, out-of-roundness, and so forth, in a manner which will be more specifically described later.

In Fig. 8 the holder comprises a block 44 seating on the upper end of the spindle 12 and held in the same way as the other work holding blocks, and is adapted to receive a circular block, ring, or disc 45 the thickness of which is to be gauged. It is held in the block by any suitable means, such as the holding fingers 46 and the top surface may be gauged by the gauging stem 43. It will be understood that as the block and the piece 45 is rotated a single revolution by the spindle 12, variations in the height of the top surface of the work piece 45, or that is, its thickness, will be imparted to the gauging stem 43 and measured in a manner which will be later described.

In Fig. 19 is shown an arrangement for holding and gauging the raceway 47 of a ball bearing ring 48. This can be held in the same block 44 of Fig. 8 and when seated on the top of the spindle 12 will be rotated in the manner previously described. In this case, however, the arm 39 of the gauging head carries a different type of finger 49 pivoted on the arm at 50 and having a rounded end 51 engaging in the raceway 47. The other arm 52 is engaged by the gauging stem 43 and positions it, it being held against the stem by a spring 53, which also holds the rounded end 51 against the surface of the raceway. An adjustable limit stop 54 is carried by this arm to engage the arm 39 to limit upward movements of the arm under the action of the spring 53 during the operation of removing the gauged work piece and the mounting of a new piece to be gauged.

Figure 3:
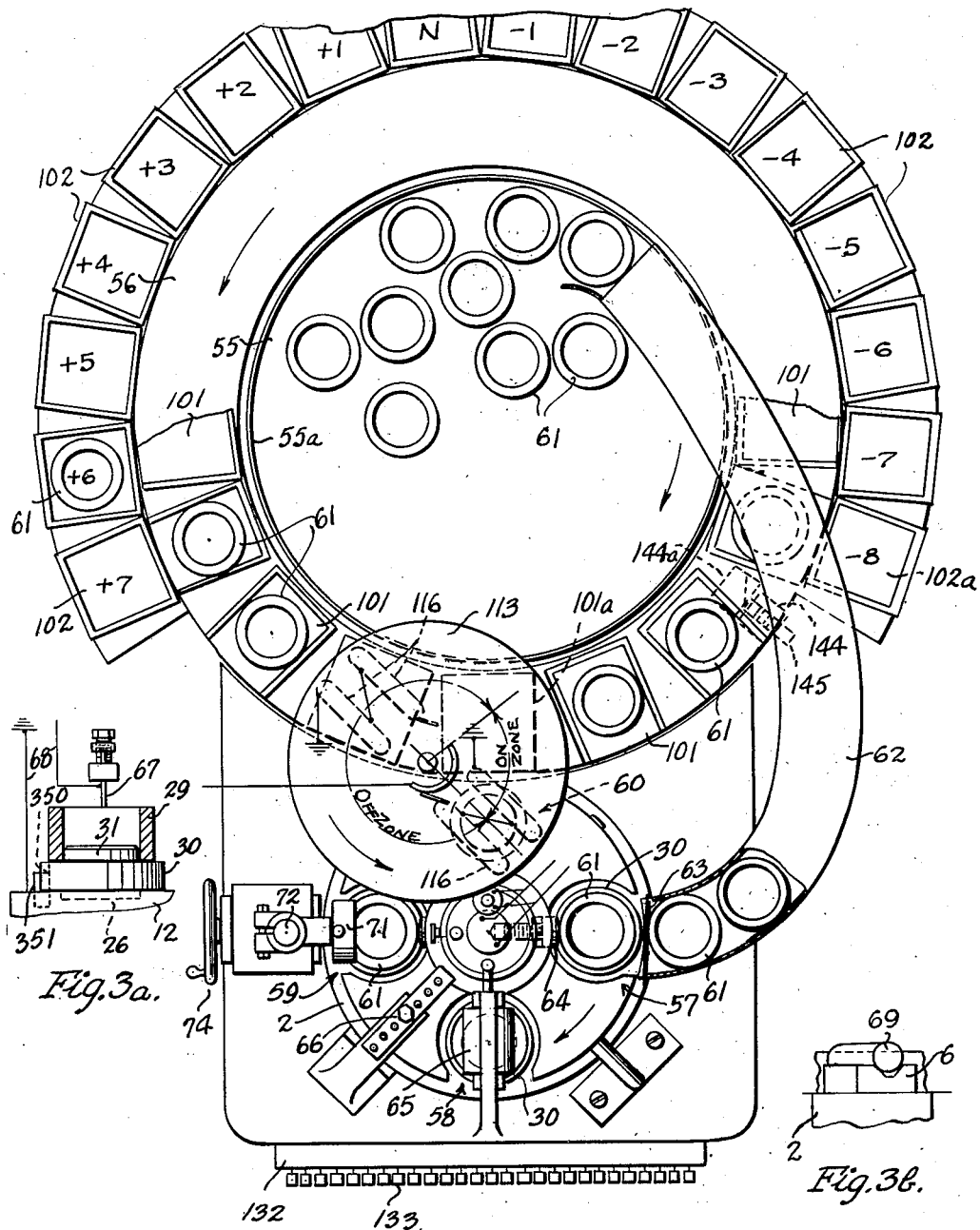
Fig. 3 is a top plan view of the machine of Fig. 1.

As shown in Fig. 3, the rotatable measuring table 2 is located at one side and preferably in front of the work feed platen 55 and the sorting table 56. This measuring table, as previously indicated, has four stations, comprising the feed station 57, the work checking station 58, the gauging station 59, and the ejecting or work transfer station 60. The work pieces, indicated at 61, are fed from the work platen 55 to the feed station 57 by any suitable feed mechanism or device, in the present instance comprising a chute 62 extending from position at one end over the feed platen to receive the work pieces from it, the platen being rotatable, as indicated by the arrow, and at the delivery end the feed of the pieces to the work holder 30 is controlled by a suitable control mechanism, such as a control stop gate 63. Associated with the station may be a limit stop 64 to prevent the work pieces from overfeeding the work holder, and to insure that the work piece assumes its position on the work holder and about the boss 31, as shown in Fig. 3a. On the next indexing movement of the measuring table, under the action of the Geneva movement, the work piece is carried as indicated by the arrow to the work checking station 58. At this station it passes under a pressure roller 65 which insures that the work piece is properly forced down to its lowermost position and properly seats on the top of the block 30. From this position it passes on the next movement of the measuring table to the gauging station 59. As it does so, it passes under a safety checking device 66 which checks to see if the work piece is properly positioned on the work holder. This may comprise any suitable device, such, for example, as a series of contact pins 67 (Fig. 3a) spaced fairly close together with the lower ends at the proper level slightly above the top surface of the work piece, so that if the work piece is properly pushed down to the position in which it should be, it will pass under these fingers without contacting them, but if it should be placed too high on the work holder, then it will contact one of these fingers and close an electric circuit 68, as indicated in Fig. 3a, and either sound an alarm or stop operation of the machine, preferably the latter, so that the trouble can be corrected before the work piece, thus improperly placed, is gauged.

At the gauging station 59 is located the gauge and its support, shown more clearly in Figs. 1, 3, 11 and 12. In Fig. 3, the work piece being gauged is shown as a cylindrical sleeve or ring, but in Figs. 1, 11 and 12 the work piece 69 is shown as a cylindrical piece and is supported in the work holding block 6 in which the work is seated in a V-shaped groove 70, which automatically positions and centers the work piece, but the gauging mechanism is the same in both cases.

As shown, the gauge 71 is mounted on a suitable support, such as the column 72 rigidly mounted on the frame, and the gauge is mounted for adjustment so that it may be properly and accurately positioned with respect to the measuring table and the work holders, and, therefore, the work pieces brought by this table to the gauging position. The column itself is mounted on a supporting base 73 mounted for adjustment toward and from the measuring table 2. The base may be mounted in any suitable guiding means, such, for example, as the conventional dove-tail or V-shaped guideway, not shown, and may be adjusted along this guideway by a suitable adjusting screw, also not shown, operable by any suitable means, such as the hand wheel 74. The gauge 71 is carried by a rearwardly extending split extension 75 embracing the column 72 and adjustable vertically on this column to adjust the position and height of the gauge. This may be accomplished by means of an adjusting screw 76 operated by any suitable means, such as the hand wheel 77, and having threaded connection with the support 75. After adjustment to the proper height the gauge may be clamped in the adjusted position by the clamping screw 78.

Figures 11, 12:
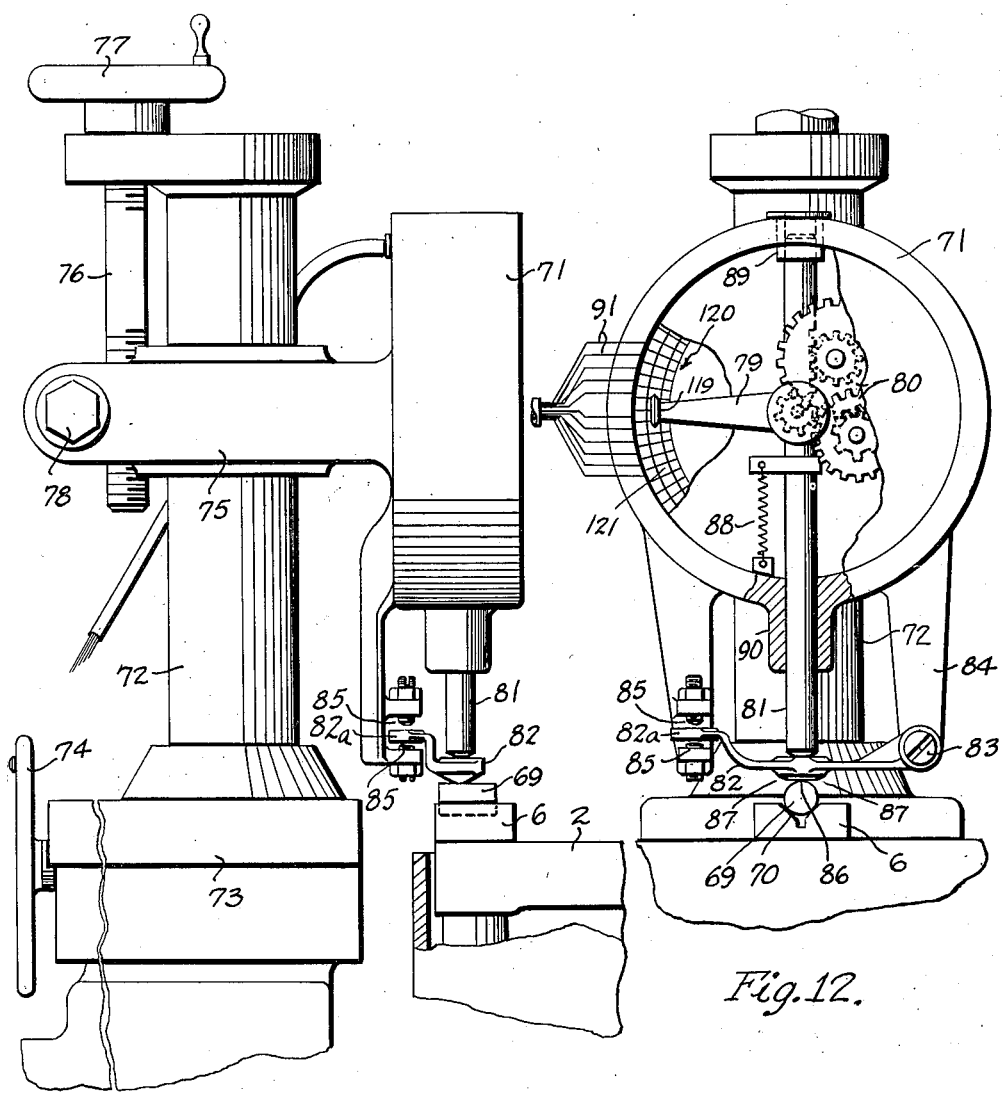
Fig. 11 is a side elevation of the gauge and its support and a portion of the work turret, with parts broken away to more clearly show the arrangement.
Fig. 12 is a partial section and partial front elevation of the gauge and its support looking from the right of Fig. 11.

The gauge is preferably the conventional gear type of gauge comprising a movable hand or pointer 79 operated through a step-up gear train 80 by the gauging stem 81 (or stem 43 of Figs. 7, 8 and 19) adapted to either engage the work piece directly, as shown somewhat diagrammatically in Fig. 1, or positioned through an intermediate member or lever 82, as shown in Figs. 11 and 12. The latter arrangement is preferred because it prevents wear of the end of the gauging stem by contact with the work pieces, and furthermore, in rapid gauging operations it is a material advantage and assists in securing much more accurate gauging because with this device there is no lateral pressure on the gauge stem 81 to give a lateral cramping effect on this stem and increase its lateral friction in the guide bearing. In other words, it permits the stem a free movement. This member 82 is pivoted at 83 to any suitable supporting arm 84 depending from the housing of the gauge, and at the opposite side of the stem 81 is provided with adjustable limit stops 85 to limit the movements of the member 82. The lower work contacting surface 86 of the member 82 is flat for a short distance to be engaged by the work piece when in the proper gauging position. If this base is flat and accurately ground and the arm and gauge are adjusted so that this surface is horizontal, even if the work piece is not accurately under the center line of the gauge stem 81 at the time the measurement is taken, but is a short distance to either side of this line, practically no error will result in the measurement and therefore this member as an additional feature assists in securing more accurate gauging or measuring and will give these accurate measurements even should the position of the work pieces on the work table be slightly out of position laterally. On opposite sides of the flat work contacting surface 86 the surfaces are inclined, as shown at 87, so as to slide easily onto the work piece as this piece is moved under the member 82 to the gauging position. The gauging stem 81 is held in its lower position against the member 82 by a spring 88 and the stem is guided into accurate vertical position by the bearings 89 and 90. The gauge arm or pointer 79 is arranged to control a series of electric circuits, indicated diagrammatically at 91, according to the measurements of the work pieces being gauged and transmitted by them to the selecting and sorting means, as will be more fully described later.

Figure 9:
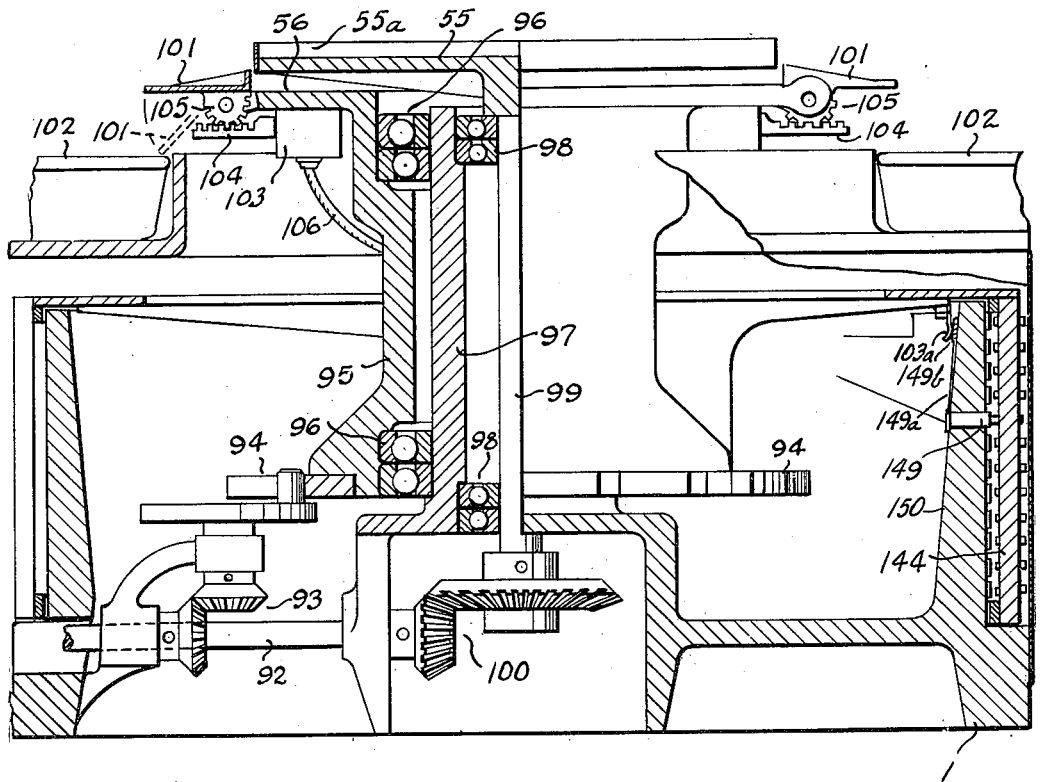
Fig. 9 is a partial side elevation and partial section of the sorting table showing the main drive for it.

The next station in the movement of the work holder and work piece is the ejecting or transfer station 60, at which station the work piece is transferred from the measuring table 2 to the sorting or distributing table 56 which is rotated in step-by-step movements in synchronism with the rotation of the measuring table 2 from the main drive and the motor 11, as shown in Fig. 9. The shaft 92 is driven by the motor 11 and through the bevel gearing 93 operates the Geneva motion drive 94 to the supporting sleeve 95 for the sorting table 56 supported in suitable anti-friction bearings 96 on the column 97, which may be a part of the frame of the machine or suitably and rigidly mounted in it. Within this column are bearings 98 for the upright shaft 99 of the feed table 55 which is driven through the bevel gears 100 from the shaft 92.

Around the periphery of the sorting table 56 are arranged a plurality of pivoted sorting platforms or receivers 101 arranged to receive the gauged work pieces as they are ejected or transferred fom the station 60. These platforms are open at the front, which front end is adapted to be tipped downwardly, as shown in dotted lines in Fig. 9, at the proper time to discharge the work piece carried by it into the proper receiving container or box 102, a plurality of which are positioned about this sorting table, as shown in Fig. 3. As the sorting table 56 is rotated, the various platforms 101 are tipped at their proper stations opposite the proper container 102, through suitable electrical control mechanism presently to be described, which is controlled from the gauge 71. As shown in Figs. 6 and 9, the operating means for these platforms may comprise an electric solenoid 103 arranged to reciprocate a rack 104 engaging a suitable gear section 105 connected to the platform 101. The solenoid is connected to the electrical control mechanism through leads 106, and it will be understood that when the solenoid is energized it will draw the rack 104 inwardly or backwardly, which will tip the free outer end of the platform 101 downwardly, as indicated in dotted lines, so that any work piece which may be on this platform will be deposited in the proper container 102 opposite which the platform 101 may be located at the time. The rack and the platform are returned to their normal position by any suitable means, such as the spring 107, Fig. 6.

Suitable transfer means is provided for transferring the gauged work pieces from the station 60 on the measuring table 2 to the platforms 101 on the sorting table 56. For nonmagnetic or relatively light weight pieces, an air blast may be provided for this purpose, as shown at 108, Fig. 6. There is one of these airblast nozzles located on the opposite sides of the work holder 6 from the sorting table platform 101, and they are controlled by a suitable valve, not shown, operated by operating buttons 109 one for each air blast carried on the measuring table and operated at the proper time through the plunger 110 of the solenoid 111. This solenoid is controlled so as to be operated at the proper time by the sequence timer 118, presently to be described.

If the work pieces are of magnetic material, a magnetic transfer device 112 may be used. This comprises a disc 113 mounted on a vertical shaft 114 driven by the gears 115 from the main drive mechanism so as to be driven in synchronism and proper timed relation with the indexing operation of the measuring table 2 and the sorting table 56. Carried by the disc 113 are two sets of electromagnets 116 controlled by electric circuits 117 on the sequence timer 118 presently to be described. At the proper time the electromagnets 116 over the gauged work piece 69a are energized by closing of a switch in the sequence timer causing these electromagnets to lift the work piece 69a from the work holder, and as the disc 113 is rotated, to carry the work piece over one of the sorting platforms 101 in the position 101a in Figs. 3 and 6, at which time the circuit to the solenoids 116 is broken by opening of the switch in the sequence timer, causing the work piece, indicated by the broken lines at 69b, to be deposited in the platform 101a. The gauged pieces are carried around by indexing of the sorting table 56 to the desired sorting containers 102 and deposited in the proper container as determined by the characteristics or dimensions measured, as will presently be described.

As previously indicated, when a work piece is gauged at the gauging station 59, the gauging stem 81 will be positioned accordingly, and this with the gear train 80 will position the hand 79 of the gauge accordingly. This hand carries a contact 119, preferably in the form of a small roller, running over and in contact with a series of contact segments 120. As shown more clearly in Figs. 20 to 23, these comprise a series of conductor blocks 121 of copper, bronze or suitable metal separated by an intervening insulating material 122 part of insulating material 127. As indicated in Figs. 21 to 23, this may be formed from an arc-shaped bar 123 of metal with transverse slots 124 through the body portion 125 and connected by the longitudinal rim 126 at the top. This is molded in suitable plastic insulating material 127, and then the rim is cut transversely with narrow saw cuts 128 which are then filled in with insulating material. The bar is thus separated into a series of insulated blocks 121. It is preferred to cut the saw cuts 128 on an angle, as indicated in Fig. 22, so that as the roller 119 moves over them the time during which it runs off one block 121 onto the other, or the break, is reduced to a minimum, thus increasing the accuracy.

Each of the metal blocks 121 is connected by a suitable lead 129 to an arc-shaped contact 130 of a manual selector switch 131, these switches being located behind a panel 132 on the front of the machine and each being operated by a manual lever 133 projecting through a slot 134 in the panel. This switch includes a movable conductor bar 135 pivoted at 136 and operable by the handle 133, one arm running on the contact 130 and the other arm 137 running over a series of insulated contacts 138. Each of these contacts is connected by a lead 139 to a solenoid 140 (Fig. 10) in a measurement signal strip 141.

Each solenoid has a plunger armature 142, the other side of all the circuits being grounded, as indicated at 143.

Figure 10:
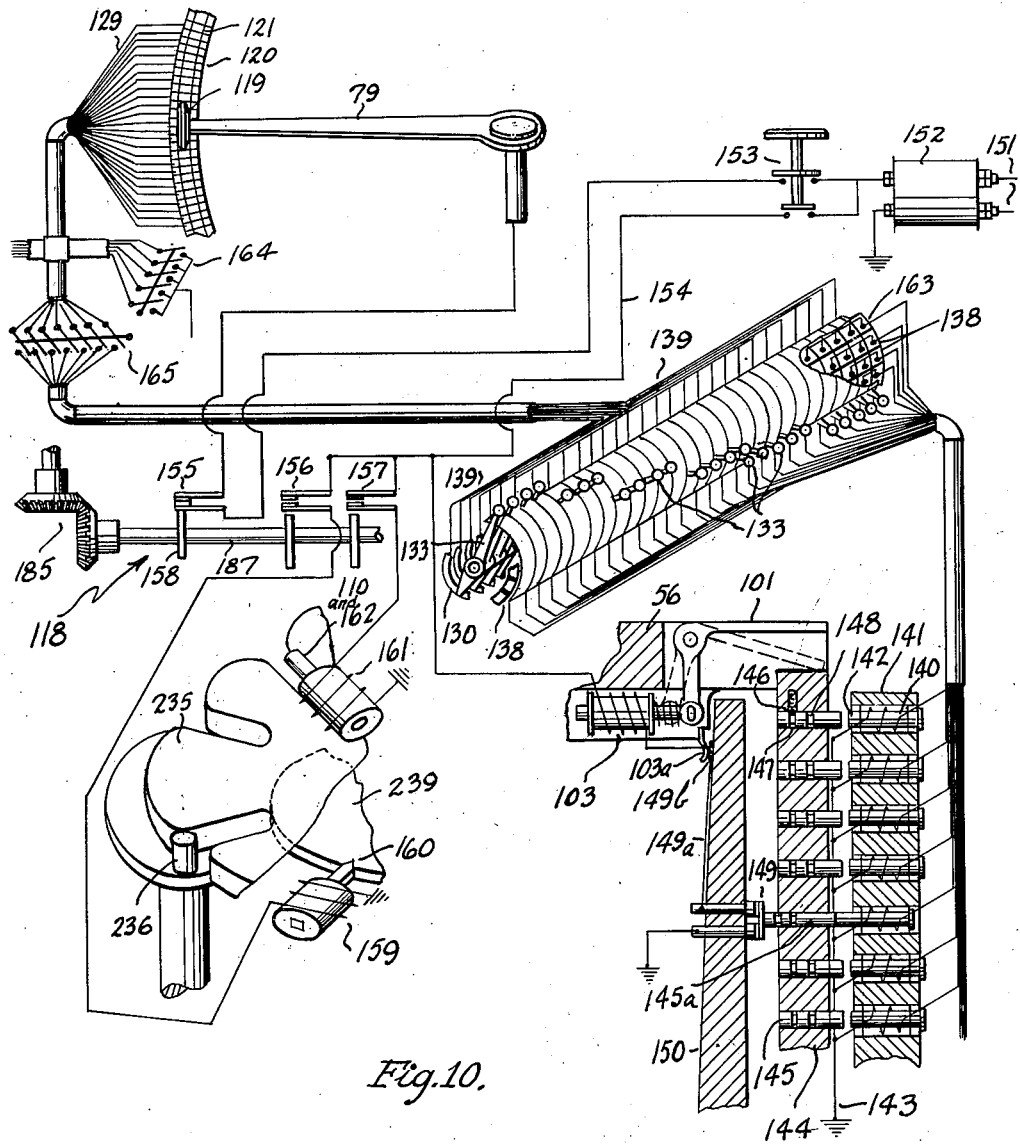
Fig. 10 is a partial schematic view and partial wiring diagram of the various circuits employed, including the selective sorting switches on the main control panel.

Mounted on the sorting table 56 so as to rotate with it, and one for each of the stations or platforms 101 is a vertical sorting strip 144. Mounted in each one of these strips is a series of plungers 145, and these plungers are so spaced that when a strip 144 is opposite the measurement strip 141, there is a plunger 145 in alignment with each of the armature plungers 142, and these plungers 145 normally project outwardly from the strip 144, as shown in Fig. 10, and are releasably held in this position by a spring-pressed ball or plunger 146 seated in a groove 147 in the plunger. Each plunger also has an inner position, as indicated by the plunger 145a, and when shifted is releasably retained in this position by the spring pressed ball or plunger 146 seated in another groove 148 in the plunger 145. As the sorting table rotates and carries with it the plurality of sorting strips 144, any plunger 145 which may have been shifted inwardly, as indicated by the plunger 145a, may close a sorting switch 149 mounted on the stationary cylindrical wall 150 under the sorting table, there being one of these switches for each of the sorting or work receiving containers 102 to control the solenoid 103 to operate a sorting platform 101 when it is opposite a container. Each switch 149 is connected by a lead 149a with one of a series of separate stationary contact segments 149b arranged in a circle on member 150 and one for each switch 149. A contact brush 103a carried by indexing table 56 is connected with each solenoid 103 and runs on the inner wall of member 150 and engages the corresponding contact 149b when its sorting platform 101 is opposite the receiving container 102 for this particular contact 149b. That is, when one of the solenoids 140 is energized by closing of a circuit by the gauge contact 119, it will shift its armature plunger 142 inwardly to shift one of the plungers 145 in the sorting strip 144 which happens to be at the time located in front of the strip 141, shifting it inwardly, as indicated at 145a, Fig. 10. Then as the sorting table 56 is rotated step by step, this inwardly positioned plunger 145 will close the switch 149 which is on the level with it when the strip 144 gets opposite that switch, and this will energize the solenoid 103 which may be electrically connected with that particular switch, which is the solenoid for the sorting platform 101 which happens to be located at that time opposite the receiver 102 for that particular switch 149, and operate the corresponding sorting platform 101 to deposit the gauged work piece which happens to be on that particular platform in the corresponding receptacle 102 placed around the outer rim of the sorting table. Therefore, every piece which is of a size to close that particular circuit will operate that same platform when it reaches a position opposite that particular receptacle 102, and therefore all the pieces of that particular size will be deposited in the same receptacle.

The different sorting solenoids 141, and therefore the specific receiving receptacle 102 may be selected for any given dimension by means of different settings of the individual selector switches 131. Current for operating these solenoids may be secured from a supply line 151 leading from any suitable source of supply to a suitable transformer 152 and controlled by a manually operated "on" and "off" switch 153. One lead 154 from this current supply is connected to each of the solenoids 103, as shown in Fig. 10, and to one side of a series of switches 155, 156, and 157 in the sequence timer 118, only a few of the switches in this sequence timer being shown in Fig. 10. Switch 155 controls the circuit through the gauge hand or pointer 119 and the cam 158 of the timer for operating this switch is so arranged as to close the switch only at the time the gauge hand 79 has been positioned by the gauging stem 81 as the work piece is gauged, so that the circuit to the corresponding solenoid 140 on the measurement signal strip 141 is alive only at this time. As shown in Fig. 10, the switch 156 controls the solenoid 159 for the locking pin 160 for the sorting table. The switch 157 may control the solenoid 161 of a work ejector 162, or this could be the control switch for the magnetic transfer 116, or for the control plunger 110 of the air ejector 108, shown in Fig. 6.

From the above it will be seen that the measuring table 2 rotates or is advanced step by step by its Geneva drive 7 and 8 or indexing movement in the opposite direction from the sorting table 56, which is also driven by its Geneva movement 94. The loading station 57 receives the part to be gauged from the chute 62 onto the work holder on the table 2. On the next indexing movement it passes under the checking station position 58, where a resilient pressure is applied to the work piece to fully seat it on the work holder. The emergency check 66 safeguards the machinery in case any work piece is not properly positioned as it passes from the checking station 58 to the gauging station 59 on the next indexing movement, and if a part should be improperly placed this device 66 stops the machine. At the measuring station 59 the gauge 71 measures the part on the work holder positioning the arm 79 of the gauge on the proper segment 121 (Figs. 10, 12 and 20) according to the proper increment of size of the work piece, and this closes the circuit so as to transmit a signal to the proper size solenoid 140 on the work measuring signal strip 141. This sets the proper plunger 145 in the sorting strip 144 which happens to be at this time opposite the signal strip 141, and this set plunger is then carried around by the strip 144 with the indexing movements of the sorting table until this set plunger 145 closes the proper switch 149 (Figs. 2 and 10) controlling the solenoid 103 controlling the discharge platform 101 on which this particular work piece was deposited or transferred from the work holder at the work transfer station 60, and, therefore, by operation of the platform 101 this gauged piece will be deposited in the proper container 102 in the proper sorting platform position corresponding to this particular signal. In other words, the sorting platforms 101 on the sorting table 56 carry the part that has just been measured around until the receiver 102 for the proper size designation has been reached, at which time the platform carrying this part is tilted, allowing the part to slide into the sorted part box 102 in which it properly belongs. It will be understood that each Geneva motion index advances the measuring table 2 and the sorting table 56 one station so that another part to be measured is placed from the feed chute onto the work holder at the loading station 57, so that a work piece is gauged at each indexing operation and also in each operation a gauged work piece is transferred to the sorting table after the proper signal has been transferred to the measurement signal strip 141 and set up in the proper sorting strip 144 to control the particular sorting platform 101 for which a plunger in this strip is set by this signal. Therefore, in this machine it is not necessary to wait for a gauged piece to be carried to its proper sorting box before the next piece is gauged, but a piece is gauged on each indexing operation, the proper signal is immediately set up, according to the increment of size of this work piece, on the corresponding sorting strip 144, and then the set up plunger on this strip trips the platform 101 carrying the work piece which set up this designated plunger 145, and trips the platform at the proper sorting box independently of any further gauging operation on subsequent work pieces.

The particular solenoid 140 on the measurement signal strip which is to be energized by the gauge arm 79 for any increment of measurement of the work piece is determined by the hand operated selector switches 131. It will be seen from Fig. 13 that by swinging the lever 133 downwardly the sector 130 which is connected to a block 121 in the gauge segment may be connected to any one of the contacts in the segment 138, each of which is in turn connected to one of the solenoids 140 in the measurement signal strip 141. By connecting certain of the blocks in the segments 138 of the different switches, as indicated at 163, Fig. 10, any combination of signals can be placed in one group. That is, the terminals 138 of these switches may be connected so as to have different groupings so that special selections of any conceivable combination of increments can be made by simply manually moving the individual increments switches to the proper terminals. This also provides for special groupings of oversize and undersize measurements as determined by the terminal settings on the switches. Thus the work pieces which fall within that group, or that is, fall within the increments of measurement or tolerances between the maximum and minimum, will all be deposited in the same sorting box or receiver 102. When the part or work piece on the work holder at the measuring station on the measuring table comes to a stop, between indexing or advances of the Geneva motion, the sequence timer 118 closes the electrical switch 155 allowing the increment measurement circuit 129 on which the gauge contact 119 of the gauge has been located by the gauging operation to be set up in sorting strip 144. Each increment on the gauge, within the usual range, has its individual circuit to the proper solenoid 140 on the vertical measuring signal strip 141. This solenoid sets the proper pin 145 in the sorting strip 144 which later closes the proper designation switch 149 when it reaches the proper position by rotation of the sorting table.

The above described arrangements of the device are used for all comparator size measurements. When measurements of variation of comparator size are desired, such, for example, as eccentricity, lack of parallelism, runout of two faces, and so forth, in which the increments within the size variation of the measurement become additive, the sum of the increments only is desired for sorting of the parts being measured. For changing to this type of measurement another or master switch is used in the wires in the cable from the commutator segments 121 that will close all of the increment circuits 129 whenever the additive type of measurements are to be made. This switch is shown at 164, Fig. 20, and at the same time the connections of the circuits 129 to the panel switches 131 are opened by the same or a similar switch 165. The increments of the gauge, that is, the segments 121, that are contacted by the contact 119 on the measurement indicating arm of hand 79 when the circuit is closed by the sequence timer 118 during the interval of measurement in the cycle, produce impulses in the telephone type of stepping switch 166 which acts as a counter of increments and which adds them to their individual work part reaching total. Another switch 167 is then closed by the sequence timer after the above cycle has finished, so that the total increment number signal is used to actuate the solenoid 140 at the proper level in the vertical measuring signal strip 141. This is secured through the rotating counter brush 168 which is operated by the counter or stepping switch 166, the brush 168 running over a fixed commutator 169 which is composed of a series of insulated segments 170 each of which is connected by a lead in cable or conduit 169a to one of the manual selector switches 131 in the front panel 132 from which the leads lead to the respective solenoids 140 in the selector strip panel 141. The sequence timer switch 167 is closed only after the increments have been counted and set up on the brush 168 by turning it through the counting device 166 which is operated step by step by the solenoid 171 whose core 172 attracts the armature 173 on the arm 174 to operate the counter. This solenoid 171 is energized, and, therefore, there is one step increment addition transmitted by the counter 166 to the brush 168 for each sector block 121 contacted by the pointer contact 119 during its movement over the commutator sector 120, the circuit from these segments being through the sequence timer switch 164a to the solenoid 171 from the power line 175. The circuits from the segments of the commutator 169 to the selector signal solenoids 140 are energized from the power line 175 through a sequence timer switch 167 and the slip ring brush 176 to a contact ring 177 rotating with the brush 168.

Measurements of this additive type, such as eccentricity on outside surfaces, require the work holder to be rotated once during the gauging operation, and then stopped to enable the gauge stem 79 to fully cover the variations of the surface being gauged. When eccentricity of a hole and other internal surfaces is required to be measured, the work holder has to be raised so that the gauge stem will contact the work surface, and then the work is rotated once and stopped, and then lowered to its initial position to clear the gauge stem when the work piece is shifted to the next position. Examples of the measurement of eccentricity of outer surfaces are indicated in Fig. 7 and the upper dimension 178 of Fig. 25. After engaging the feeler 40 positioning the gauge stem 43, the work piece 36 is rotated one revolution by rotating the work holder spindle 12 through the gear drive 21 and 22, as previously described, the motor of this gear drive being controlled by one of the cams and switches in the sequence timer 118. Examples of internal measurement are shown in Figs. 19 and 24 and at 179 in the lower part of Fig. 25. In making these measurements, the work holder is raised to carry the work piece, such as shown at 48 in Fig. 19, to the proper height so that its internal surface 48 is engaged by the feeler 51 of the gauge stem 43, the work holder and its supporting shaft 12 being raised to this position by the cam 23 (Figs. 4 and 5) and then the spindle and work holder with the work piece is rotated one revolution by the drive 21, 22 controlled by the proper cam and switch in the sequence timer 118. If variations in the thickness of a collar, such as 45 shown in Fig. 8, is to be measured, the work holder 44 and its supporting spindle 12 are rotated one revolution in a similar manner while the gauge stem 43 is in engagement with the top surface of this collar, during which rotation the variation increments are transmitted to the stepping switch or increment counter 166 and set up by rotating the counter brush 168, and then the result of the added increments is transmitted to the selector signal strip 141, as above described. When the measuring cycle is finished, the stepping switch 166 has the total number of impulses recorded at the proper bar on the commutator 169. The increment wires from each bar of this commutator are led to the measurement signal strip solenoids 140 with one to each individual size, so that when the total signal current is closed the proper signal, that is for the total only, is given, the proper solenoid 140 for this total is the only one energized.

In making these measurements, in the production feeding of parts, it is not possible to tell where the high or low point of the variation of the measurement will be, as in eccentricity or lack of parallelism, for example, and therefore the parts to be measured have to be taken as they come and accurately measured. This is done, as indicated, in this device, by rotating the work holder and therefore the work piece carried by it, one rotation while this work piece is at the measurement station on the machine. The measuring cycle circuits are on during this complete rotation through the sequence timer switch 164a, because in this measurement the gauge hand 79 covers the range of variation twice to reach its starting point. These are indicated in Fig. 20 by the arrow headed arcs A, B and C. In the case of A, for instance, the work piece is apt to be positioned on the holder so that the gauge stem 43 is positioned by the most eccentric part of the surface, and the gauge arm 79 at the start of the revolution of the work piece is on the position 180. As the piece rotates, it drops, as indicated by the left hand line A, to the lowest position 181 and then back again to the highest 180 during one revolution of the work piece. During this time the contact 119 passes over the segments in the commutator 120 from the position 180 down to the position 181 and back to the position 180 again, thus contacting each segment 121 between these two positions twice and thus energizing each circuit 129 connected to these segments twice. Therefore, as each circuit is energized it will operate the solenoid 171, the sum of all the contacts will be added up on the stepping switch or counter 166, shifting the counter brush 168 a corresponding number of segments 170 on the commutator 169. Then at this point the circuit is closed by the switch 167 in the sequence timer 118 causing the energizing of the proper solenoid 140 on the measurement signal strip 141 which in turn will set the proper plunger 145 in the sorting strip 144 which happens to be positioned before the signal strip at that time, and then as the sorting table is later rotated this will operate the proper selective switch 149 to trip the proper sorting platform 101 to deposit this work piece in the proper container 102.

If at the time the work piece first contacts the gauge stem it is in such position as to position the gauge arm 79 in the intermediate position 182, and then goes to the maximum and back to the minimum and up to the position 182 again, it will move according to the curve B during one revolution of the work piece. According to the lines of motion C the work piece is so positioned as to position the gauge arm 79 at an intermediate position 183 when the gauge stem first contacts the work piece, and then during one revolution of the work piece is moved to the maximum 180, back to the minimum 181, and then up to the starting position 183 again, at which time the proper solenoid 140 in the signal strip 141 will be energized. These movements, A, B, and C are shown merely by way of example, it being understood that in different work pieces more or less of the segments 121 will be contacted during one revolution of the work piece, depending on the amount of eccentricity of surface being measured. The movements A, B and C merely show some of the positions a given work piece may assume when placed on the work holder, and the movement of the gauge arm in measuring the eccentricity of the surface of that piece in increments during one revolution, and these increments being added up by the counter or stepping switch 166 to insure energizing of the proper solenoid 140 in the signal strip 141.

It will, therefore, be seen that it makes no difference to the circuits or to the gauge where this rotation of the work piece starts, as by this device the full number of size increments signalled from the segments 121 are recorded on the stepping switch 166, and the total sent to the measuring signal strip 141 for sorting. The stepping switch 166 is a standard structure, which may be purchased on the market, is extremely fast, being capable of taking from 30 to 80 impulses per second which is ample for this device. After the counting cycle is finished and the total increment signal has been sent to the measurement signal strip 141, the stepping switch 166 instantly and automatically resets itself to its initial counting point ready for the next cycle of measurement on the next work piece to come to the measurement station by closing of a switch in the sequence timer.

One of the vital and important parts of the device in automatic measurement is the timing control. In this device, where precision high speed automatic measurement is achieved, split secondary accuracy of timing of every circuit in the entire machine is important, and this is accomplished and controlled by a precision sequence timer indicated at 118 and shown more in detail, but still somewhat diagrammatically, in Figs. 15 and 16. This timer is driven by the shaft 184 through driving gears 185 from the main drive shaft 10 to insure positive timing without error at all times during the operation. Each circuit has its individual cam 186 shaped for exact timing with a securing key 186a on the timer shaft 187, so that each cam is placed in exact proper position on the shaft to open and close its switch and the circuit controlled thereby specified on the timing diagram. A side view of one of the cams 186 is shown in Fig. 16, the raised portion 188 indicating the time at which the switch 189 controlled by the cam is "on" or closed. This is shown merely by way of example, as it will be understood each cam is shaped for the operation of the particular circuit controlled by it, and the raised portion may be long or short or there may be more than one raised portion on the cam if that particular circuit is to be closed more than once during one revolution of the shaft of the timer. The switch indicated in Fig. 16 includes a spring contact member 190 mounted in an insulating support 191 and having a roller 192 running on the surface of the cam. Above this is another spring contact 193, the two contacts having spaced contact lugs or points 194 for making and breaking the circuit, and the contact 193 is mounted on the micrometer adjustment 195 for precision adjustment of this contact for specific and accurate timing of the opening and closing of the circuit. It is to be understood the type of sequence timer shown is for illustrative purposes only, and that any preferred type of precision sequence timer of mechanical or electrical design may be used, depending on the requirements of the machine. In the present arrangement, one complete cycle is performed on one rotation of the main drive shaft, and during this time every function on the entire machine is performed and controlled through the sequence timer. It is essential that every individual circuit have its cam so timed as to positively assure opening or closing of that circuit at exactly the precision time specified in the work diagram. Whether open spring switches of the type shown, or any of the endorsed rapid type switches are used, is immaterial for the description, the simple type switch being shown for simplicity and clarity, for easier understanding of the operation of the device.

The individual cams and switches for actuation of all circuits may be changed at will by removing and replacing with another set of cams for the timing desired for any particular machine or any particular operations. Once a machine is timed for a given class of work and for the shop in which it will be operated, there is little probability in ordinary practice that it will ever be necessary to change the timing, unless a radically different type of work is to be handled or at some critical speed far different from the particular machine setting. As the main drive motor is of variable speed construction, it is possible to speed up or slow down the machine to suit various types or different ranges of work. Every function on the machine being accurately and rigidly sequence-timed assures perfect functioning of every element within the time cycle assigned to it.

As an example, and to show the different circuits controlled, the different cams of the sequence timer, as shown in Fig. 15, have been numbered consecutively and although each may be operated automatically, some of them are also controlled by manual switches so that their functions may be eliminated in gauging certain types of work where certain operations are not required. Thus, cam 1, may be an on-off switch for the gauge circuits 129 and may correspond to the switch 155, Fig. 10.

2. On-off switch for sorting and grading circuits.

3. On-off switch for gauge. Regular to eccentric circuits.

4. To automatically bring work station to measurement position, and removing former station from this position.

5. To automatically raise work station to measurement position.

6. On-off switch control of raising operation.

7. To automatically rotate work station one revolution and stop.

8. On-off switch control of rotation operation.

9. Automatic measurement with automatic gauge.

10. To automatically lower work station to table level.

11. On-off switch to counter on eccentric circuit.

12. On-off switch to counter selector on eccentric circuit.

13. On-off switch to counter reset on eccentric circuit.

14. On-off switch to ejector on magnetic timing cycle.

15. On-off switch to ejector airblast valves, and so on.

It will be understood more or less cams may be provided to suit the circuits desired for the machine.

Figure 37:
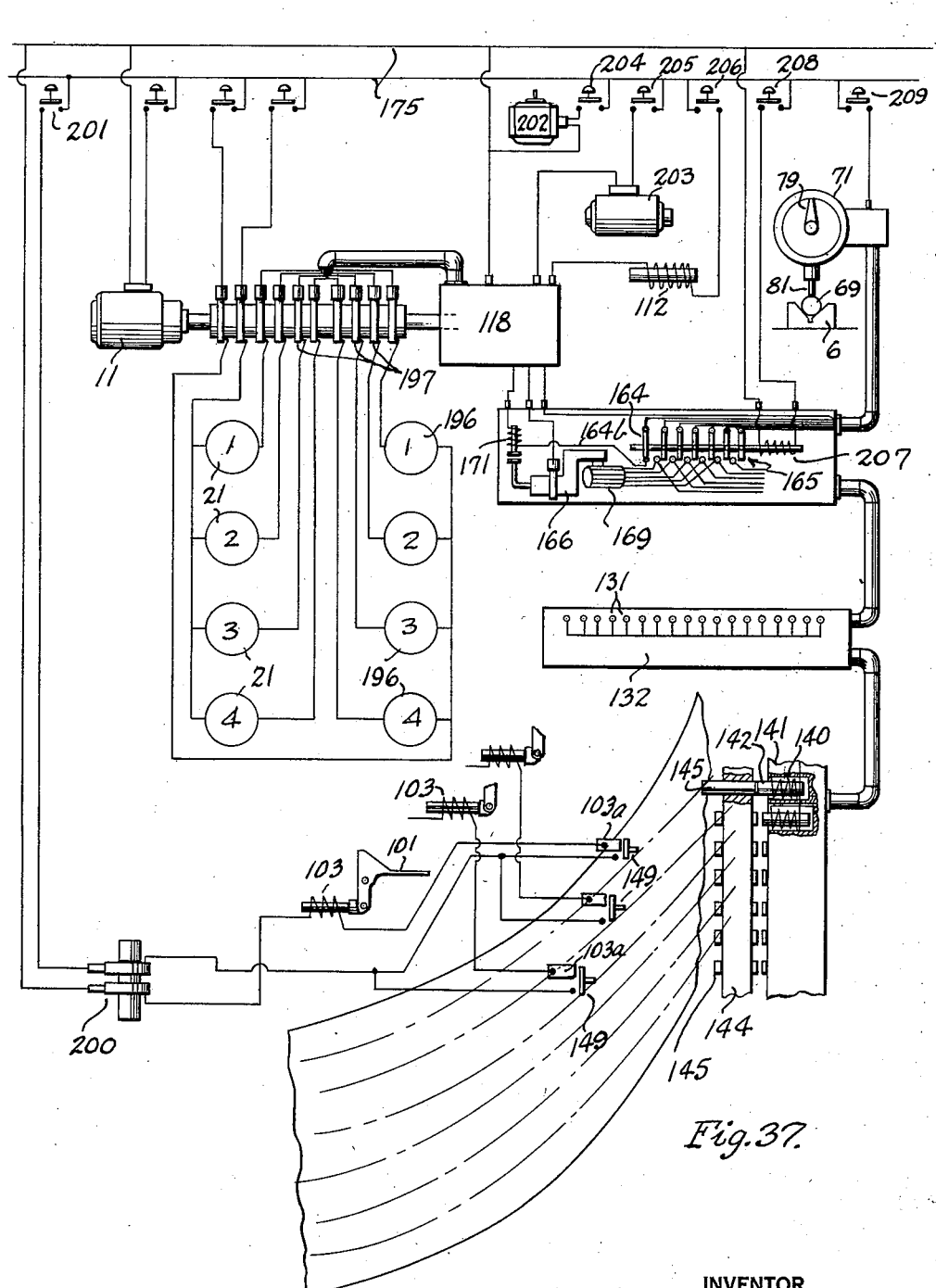
Fig. 37 is a schematic wiring diagram for the machine.

In Fig. 10 of the drawing, wiring diagrams are shown for operation of the selective sorting of the work pieces, and in Fig. 20 a wiring diagram is shown arranged for additive increment gauging control and selection and sorting of the pieces according to this additive increment gauging. These are separated in the drawings for more easy understanding of the two types of gauging, but it will be understood that the circuits of the machine and the control switches are arranged so that either type may be used, as desired, by merely setting the proper switches. To make this more clear, a schematic wiring diagram of the circuits for both types of gauging and their interrelation is shown in Fig. 37. It is to be understood that the machine is not limited to the arrangement shown, as this illustrates only one way of wiring the machine, as both the single or two wire systems are widely used as well as other modifications to shorten the wiring and simplify connections. It is first desired to control the operation of the machine manually according to its functions and the type of gauging or measurements which are to be made, and to provide full flexibility in its use, both in setting up for a given job to be run or of checking during a production run; also to enable quick change from one set of operations to another, thus giving maximum flexibility.

For example, some measurements require the use of both the elevating motors, operating cams 23 at the work station for lifting the work spindle and the work carried by it, these motors, one for each spindle being indicated at 196, controlled by one of the cam operated switches in the sequence timer 118; and the rotating motors 21, one for each spindle, also controlled by a similar cam controlled switch in the sequence timer, as the work spindles 12 rotate. Current is carried to them through a suitable slip ring 197 rotating either with the spindle or the tables on which they are mounted. Other measurements require only one motion for the part measured, such as either the elevating motion or the rotating motion, and as previously described, gauging or measurement of some parts do not require either motion for or during measurement or gauging.

A set of manually operated switches, such for example as push button or equivalent types for hand control, is located conveniently on the front of the machine, as indicated, for example, at 198 in Fig. 1, or motion controls, as shown for example at 199 in the same figure, associated with the selecting sorting panel 132 in which the operating levers for the hand operating selector switches 131 are mounted.

Slip rings are also necessary for both measurement table and sorting table wiring, as indicated, for example, at 200, Fig. 37, as both these tables rotate continuously step by step in one direction under action of the Geneva motion indexing drive. These circuits may be controlled by suitable hand switches 201.

It is preferred that the sorting table wiring be independent of the measuring table wiring, to thus insure greater simplicity in manufacture and control.

The entire timing of the machine, so vitally important in fast automatic machine operations, is handled by the micro adjustable switches 189 within the master sequence timer 118, which may be of any conventional design, providing precision timing and control from the electric current "on" and "off" only as required. This control starts and stops each function of the machine at the exact time and in the sequence required in meeting each part of the complete cycle of motion or functions of the machine.

The feed table motor 202, the axial play motor 203, and the wiring for the magnetic ejector or transfer device 112 at the transfer station 60 are all manually controlled by hand operated switches 204, 205, and 206. The feed table motor may be of the variable speed type and, if so, will have auxiliary control equipment for the motor to control the speed to suit, which auxiliary equipment is not shown, as standard equipment may be used for the purpose.

The automatic gauge wiring to shift from straight control to the additive type of increment control comprising the switches 164 and 165, may be operated by a solenoid 207 controlled by a hand switch 208. The armature of this solenoid may be connected with a spring so that the switches stay in one position when power is not on, or a double-acting solenoid actuator could be used. These switches 164 and 165 are multiple point switches, as indicated in Figs. 10 and 20, but in Fig. 37 the multiple elements are shown for switch 165, but only a single element is shown to illustrate the switch 164 diagrammatically. They are arranged so that when the switch 164 is closed for the additive increment type of gauging, switch 165 is open, but when used for straight gauging switch 165 would be closed while switch 164 is open. It will be understood from Fig. 20 that when the switch 164 is closed, all the circuits 129 from the gauge segment 120 are connected to the single lead 164b leading to the timing switch 164a in the sequence timer 118 and to the additive increment counter solenoid 171. This arrangement therefore assures that either one or the other type of gauging circuit is on all the time, but never both. Various types of automatic gauges may be used with this machine, that shown being by way of example. There may also be a hand switch 209 for the gauging circuits to connect and disconnect them from the power lines 175.

As described above, the additive increment circuit for the additive increment type of gauging requires a wire to connect all the increment circuits 129 from the gauge to cause impulses to the counting relays 171, 166, which may be part of a stepping switch element construction of any conventional design (such, for example, as are used in telephone work). For counting every increment signal in the additive increment type of measurement, the increment segments on the commutator 169 are each wired to one of the increment contacts of the switch 165, as indicated in Fig. 37, and through it to one of the manual selective switches 131 in the front control panel 132, from which the final additive signal is transmitted to the proper solenoid 140 in the selective signal panel 141 and through it transmitted to the proper selective sorting strip 144, and, therefore, it will be seen there is great flexibility available for setting up the additive type of gauging as well as the straight sorting type. The selection panel 132 allows of the selection of any sorting, by increments, or groups, or both, and the proper signal is passed along directly to the measurement signal strip 141.

After the set plunger 145a in the sorting strip 144 has operated the proper sorting switch 149 to discharge the work piece in the proper sorting container 102, means should be provided to reset this displaced plunger in its normal position for operation on the next cycle for that particular strip. A stationary resetting strip 144a (Fig. 3) is therefore provided after the strips 144 have left the last container 102a and provided with cams 144b, one for each plunger in strips 144, so as to reset any plunger in each strip before the strip reaches the gauging position.

A somewhat modified type of machine is illustrated in Figs. 38 to 40 and 48 to 50. This alternate type of construction illustrates how the same principles of the invention can be employed in a machine combining the measuring and sorting tables in one table. In doing so, the work station spindles 210 corresponding to the spindles 12 of the first form are mounted directly upon the sorting platforms 211 corresponding to the sorting tables 101 of the first form. This, therefore, makes a more complicated construction as a much larger number of the precision work station spindles are required. and where only four of these work station spindles are required in the first or preferred type, there would be one for each of the sorting bins or containers 231 located around the table 222 and additional spindles for the loading or feeding station, the work checking station, and the gauging station. It might require as many as twenty-six increments of size with a corresponding number of stations.

Figure 38:
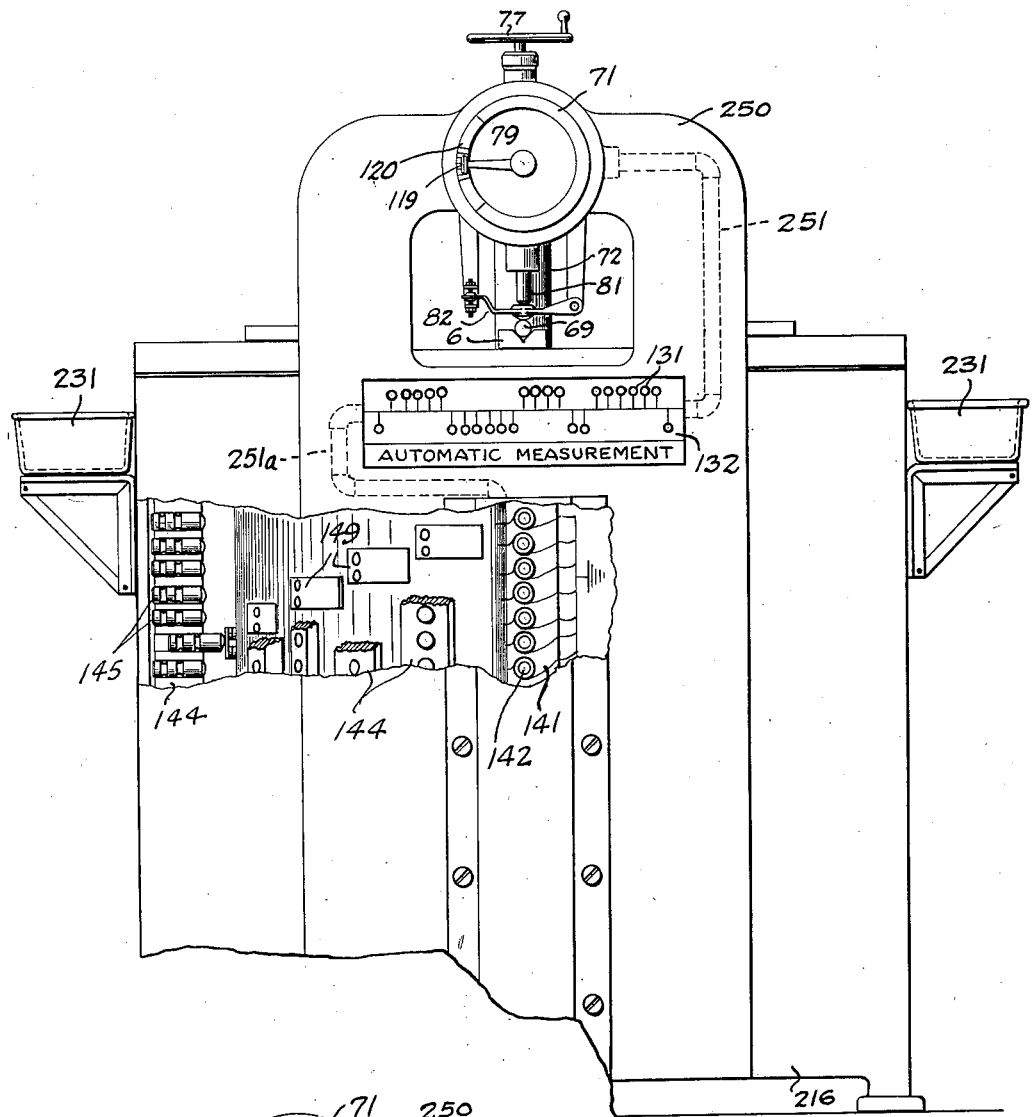
Fig. 38 is a partial front elevation partly broken away of a modified arrangement of gauging machine in which the gauging is done on the sorting table.
Figure 39:
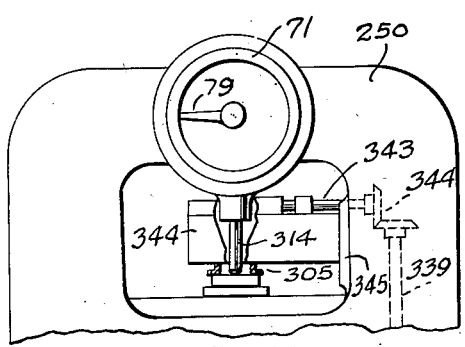
Fig. 39 is a partial front elevation partly broken away of the gauge and associated parts indicating a gauging operation for a specific type of work piece.

Fig. 38 illustrates a front elevation of such a machine, with parts broken away to illustrate the sorting control. It will be seen this form of machine comprises a feed table 212 mounted to rotate with an upright shaft 213 mounted in suitable preloaded ball bearings 214 in a central column 215 of the base or frame 216 and driven from the main drive motor (not shown), corresponding to the main drive motor 11 of the first form, through the main drive shaft 217 and suitable gearing 218. The shaft 217 may be driven from the motor by a V-belt drive to the V-belt pulley 225 on the shaft. Surrounding the periphery of this table 212 is a guide rail 219 to keep the work pieces, a few of which are indicated at 220, on the table, this rail being mounted on a suitable plate or other support 221 under the table and mounted on the top of the column 215 of the bed or frame. Mounted to rotate on the outer side of this column is a work table 222 including a central sleeve portion 223 mounted by the preloaded ball bearings 224. On the periphery of this work table are mounted the work holders, those shown in the drawing being mounted on a series of spindles 210, one for each station, and each spindle is mounted on a table 211 pivoted at 226 to the work table on preloaded ball bearings for accuracy, and this table has a downwardly depending arm 227 pivotally connected at 228 by a pin and slot connection to the armature 229 of a solenoid 230 which corresponds with the solenoid 103 of the first form for tipping the work supports at the proper time, as determined by the gauging apparatus, to deposit the gauged pieces in the proper receptacles 231 corresponding to the receptacles or boxes 102 of the first form. Energization of the solenoid will tip the holder and the work spindle 210 downwardly, as indicated in dotted lines, to transfer or discharge the work piece from the work holder 232 on the spindle into the proper receptacle 231, it being returned to the normal position and retained there by a return spring 233. A stop 211b on the platform comes up against a positive accurately positioned locating stop 211c on the work table so as to get accuracy of measurement. The solenoid 230 and therefore the work holders are controlled from the gauging apparatus in the same manner as in the first form of the device, the base 216 including a circular upright wall 234 corresponding to the wall 150 of the first form and on which are mounted a series of sorting switches 149, one for each of the work discharge stations around the table opposite each of the receptacles 231, and as in the first form it is controlled by plungers 145 in a series of sorting strips 144, one for each station, and carried by and rotating with the work table 222, and the plungers being set by a suitably placed measurement signal strip, the same as the strip 141, and carrying similarly located solenoids 140, but which strip is not shown in Fig. 48, as it is located at the front of the machine, but is indicated in dotted lines in Fig. 40. The work table, together with the spindles 210 and sorting platforms 211, are rotated with a step-by-step indexing movement by means of a suitable Geneva movement, comprising the notched plate 235 driven by the pin 236 operated by the shaft 237 driven from the main shaft 217 through any suitable gearing 238. Means is also provided for locking the table against movement between the indexing operations, comprising a notched disc 239 cooperating with a locking pin like that shown at 116 in the diagrammatical Figure 10 and operated by solenoid 159 controlled by the sequence timer 118. Only one of the sorting switches 149 is shown in Fig. 48, but it will be seen that it is electrically connected with one of the slip sections 222a (Fig. 48) one for each sorting container 231, with a source of power, and through the advanced plunger 145 and the bar 144 through the lead 240 to the solenoid the other terminal of which is grounded or leads to the other side of the power circuit through brush 222b depending on whether the single wire or two wire system is used. Segments 222a correspond to the contact segments 149b of Figs. 9 and 10 and have a similar function.

The spindles 210 carrying the work holders 230 may be used stationary or they may be rotated or elevated the same as the spindles 12 in the first form and controlled by the sequence timer 118, as previously described for the spindle 12. They may be of the same construction and driven by the same gear motor drive 22 as is the spindle 12, but this is not shown in Fig. 48 to simplify the drawings. However, as the spindle 210 may be swung downwardly with its sorting platform 11, it may be driven by a drive shaft 241 mounted so that it can be lowered out of the way, as indicated in dotted lines Fig. 48. The drive to spindle 210 may be through the friction drive member 242 from this shaft cooperating with a similar friction drive element 243 on the spindle. This shaft is splined to a drive at 244 operated from a driving gear 245 operating through a flexible shaft 246 from a motor 247 controlled by the sequence timer 118, and a hand switch so that it can be thrown out of operation if desired. This motor, through the sequence timer control, will rotate the spindle 210 for one revolution for the additive type of measurement gauging, as described in connection with the spindle 12. If the type of gauging is that where the work is raised and lowered during the gauging operation, this action can be secured through a suitable cam 248 driven from the shaft 217 through an electrically controlled clutch 249 controlled from the sequence timer 118.

In this machine the gauge 71 is mounted at the front of the machine on a rigid head frame 250 mounted on the rigid base 216, and the gauge is mounted with its gauging stem 81 over the front portion of the combined sorting and work table 222 so as to be over the work pieces 69 (Fig. 38) carried in a suitable work holder 6. The gauging device is the same as that shown in the first form in Figs. 11 and 12 and may be mounted for adjustment in a similar manner on a rigid column 72, and the segments 120 of this gauge may be connected by the same leads 129 with the control panel 132 mounted in a conduit 251 enclosed in the head 250.

As the work table 222 is rotated under the indexing movements, it carries with it the sorting strips 144 carrying the projectible plungers 145, there being one of these strips for each work platform 211. After the projected plunger 145 has made its desired contact or operated its proper sorting switch 149, the plunger has to be reset before it again comes back to a position opposite the measurement signal strip 141. There is therefore provided forwardly of the strip 141 a resetting strip 252 (Fig. 40) the same as strip 144a of Fig. 3, which is a stationary strip and has a series of inclined cam surfaces 253, one in the path of each of the plungers 145 when extended so as to engage any set plunger to force it back into its normal position in the sorting strip 144 before this strip reaches its position opposite the measurement signal strip 141. This is to insure that any and all plungers which may have been set or advanced by a signal from the gauging device will be reset back to its normal position before it is again required to receive another signal and therefore will be ready to act on such a signal. This same resetting strip is used with each of the different forms of the machine, including the first form shown in Figs. 1 to 39.

If it is not desired to use the rotatable spindles 210 to support the work pieces in the device of Fig. 48, a somewhat modified arrangement, as shown in Fig. 48a, may be employed. In this arrangement a series of sorting platforms 211a may be mounted around the rim of the rotatable work table 222, corresponding to the sorting platforms 211, and any suitable work support, such as the block 6 may be mounted on each platform to hold a work piece 69b, which, as shown, may be a cylindrical member, the platform 211a being pivoted on a suitable shaft 226a held in preloaded ball bearings for accuracy, and the platform being provided with a sector gear 293 meshing with a reciprocable rack 294 operated by a solenoid 295 corresponding to the solenoid 230 of Fig. 48, and held in the projected position by a spring 296 which also holds the work platform 211a in its upper position, there preferably being accurate locating stops (not shown) the same as at 211b and 222b in Fig. 48. The solenoid 295 is controlled by one of the sorting switches 149 and operated by a set plunger 145 in the sorting strip 144 as described in connection with Fig. 48, to deposit the work piece in the proper container or bin 231 located around the outer rim of the work table.

However, in some classes of parts being measured, their ejection from the sorting platform may be slow or difficult, due to the great percentage of the surface area of the part resting upon the holder or platform in comparison to its weight, or surface roughness. In such cases saddles or supports 6 of special smooth finish and hard material to facilitate sliding of the part off the support into the sorting boxes 231 may be used, or, if desired, an air blast may be used to lift the gauged part from the supports 6. Thus, for example, there may be, as shown in Fig. 48a, an air blast nozzle 297 under the part 69b being gauged and connected by a flexible conduit 298 to a control valve 299 controlled by a switch 300, which is operated at the end of the stroke of the plunger or armature 301 of the solenoid 295 through the end 302 engaging the switch 300, at the end of the stroke when the work carrying platform 211a has been tipped to the dotted line position, to thus provide a short air blast under the work piece 69b to loosen it from its support so it readily slides from the support into the box 231.

It is to be understood that these and other well known ejecting means may be used on the sorting platform or on the measuring table work holders, as is deemed best for the particular part being measured. If desired, dash pots may be used with the solenoid operating feature to slow down action of the solenoid wherever a slap might develop.

Figure 54:
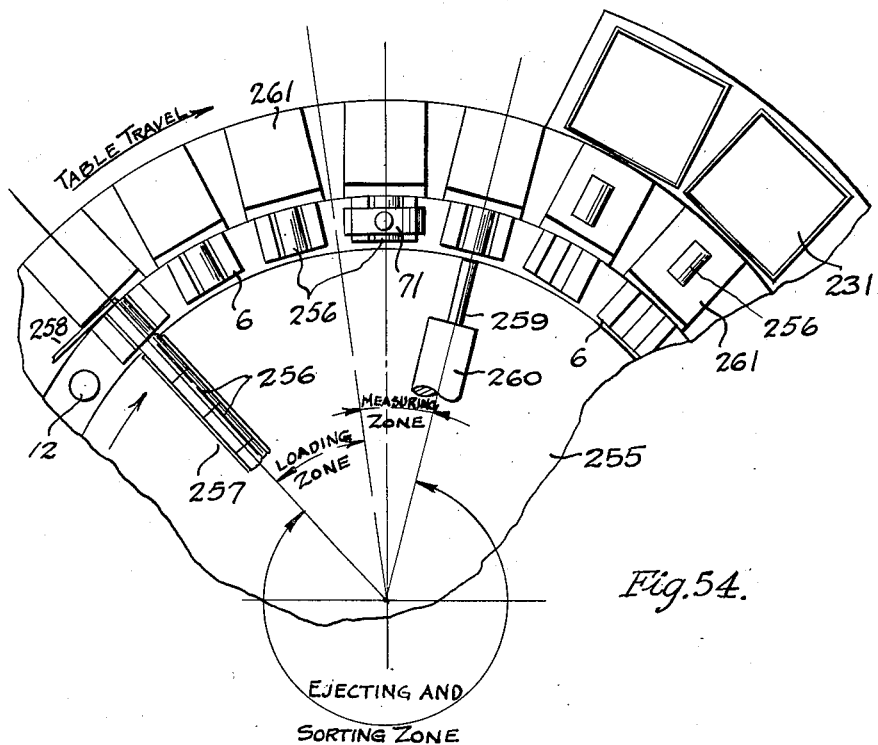
Fig. 54 is a top plan view of a portion of the gauging and sorting table.

A somewhat different arrangement is shown in Fig. 54. In this form the work measurement stations and sorting platforms are mounted on the rotatable table 255. The work stations are indicated as work holding blocks 6 with V-shaped channels 70. These are mounted on the rotatable portion of the table 255 and this table is mounted and indexed, the same as table 222 of Figs. 40 and 48. Outside the work holders but also on the table is a row of ejection platforms 261 which may be like the platforms 101 of Figs. 3, 6 and 9, and operated in the same way, and outside that is a row of stationary sorting bins 231 to receive the gauged pieces from platforms 261. The gauging head and the gauging station are shown diagrammatically at 71 over the path of movement of the work holding blocks 6 and the work pieces, in this case cylindrical members 256 fed to the blocks 6 from the feed hopper, not shown, by means of the chute 257, also shown in Fig. 52. A yieldable positioning finger 258 prevents a piece passing through and off the block and properly locates it in the groove just before it moves to a position under the gauging head. After it passes from its position under the gauging head 71 to its next position on the indexing operation, the gauged work piece is positioned in front of the plunger 259 of a solenoid operated or other type of ejector 260 (Fig. 54). This ejector would be controlled from the sequence timer 118, and if it is a solenoid operated ejector the solenoid will be controlled by a switch in the sequence timer, but if it is an air ejector the air blast would be controlled by a valve controlled electrically by the sequence timer, similar to the device 168 of Fig. 6. This operation will push the gauged work piece from the holding block 6 onto one of the ejection platforms 261. These may be the same as the platform 101 shown in the first type of device, and particularly in Fig. 9, and operated in the same manner from sorting switches 149 operated by previously set plungers 145 of the sorting strip 144, and set by the solenoid in the measurement signal strip 141 by signals from the gauge 71, as previously described. This operation of the ejector platforms 261 will deposite the gauged work pieces in the proper sorting bins or containers 231, the same as previously described.

Instead of the blocks 6 with the V-shaped retaining grooves, any of the other types of work holders may be used, depending on the types of work to be gauged. For example, vertical spindles may be used in the same location as these blocks, as indicated by the circle 12, for carrying the work holder if the work is of the type that is to be rotated during the measuring operation. Such a device is shown in Fig. 47. In this case the spindle 12, which is the same as that shown in Figs. 4 and 5, may be provided with a tapered upper end 262 on which is seated an adapter 263 having a tapered socket to seat over the taper 262 of the shaft, and having a stud 264 on its upper end to receive a work piece, such, for example, as a ring 264a which is to be gauged. If the gauging is to be for parallelism of the upper and lower surfaces of the work piece, or to see if it is of uniform thickness, a feeler 264b would engage the top surface and position the gauge finger 81, to position the gauge arm 79, as previously described, and control the sorting mechanism, as also previously described. If it is desired to measure eccentricity or out-of-roundness, then a feeler would be used engaging the outer side wall of the work piece, such as that shown in Fig. 7, or the inner circular wall, as one similar to that shown in Fig. 19, in all cases the work piece being given a single revolution, and the increments being added in the increment measuring device 166, 171. With this device of Fig. 54, any suitable feeding means for the work pieces from a hopper, such as shown in Figs. 51 and 52, or directly from the rotatable table 255, such as the chute 254 shown in Fig. 40, could be used.

Other types of work holders are shown in Figs. 41 to 46, for different types of pieces to be gauged, and these may be used on any of the forms of gauging stations described. In the form of Figs. 41 and 42, the cylindrical work piece 347 may be seated in the V-shaped groove 348 of the work holder or block 349 and mounted on the spindles 12, 210 or any of the other types of work block holding means. The block may have a notch or groove 350 in one side to receive a locating pin 351 (Fig. 3a) on the head of the block support as spindle 12 or 310, to accurately angularly position the work piece. The holder of Figs. 43 and 44 is similar to that of Fig. 3a. In the form of Figs. 45 and 46, the holder 352 may have a rectangular lug 353 to hold a work piece provided with a similarly shaped opening.

Figure 51:
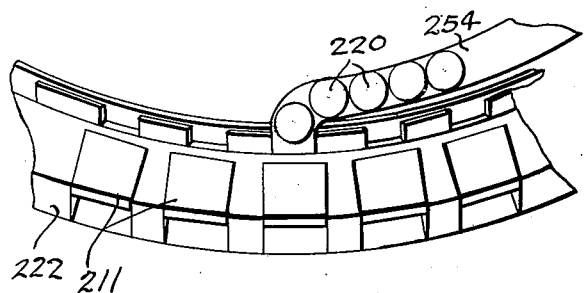
Fig. 51 is a perspective view of a portion of a feed device which may be used to feed one form of work pieces to the gauging position.
Figure 52:
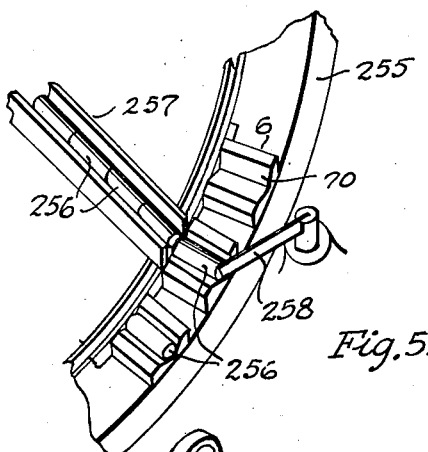
Fig. 52 is a perspective view showing the feed of another form of work piece to the holding blocks.
Figure 53:
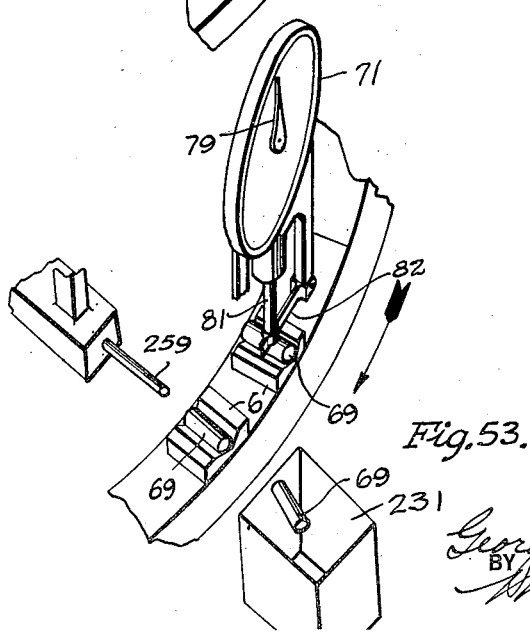
Fig. 53 is a similar view showing the gauging and ejecting of the form of pieces of Fig. 52.
Figure 55:
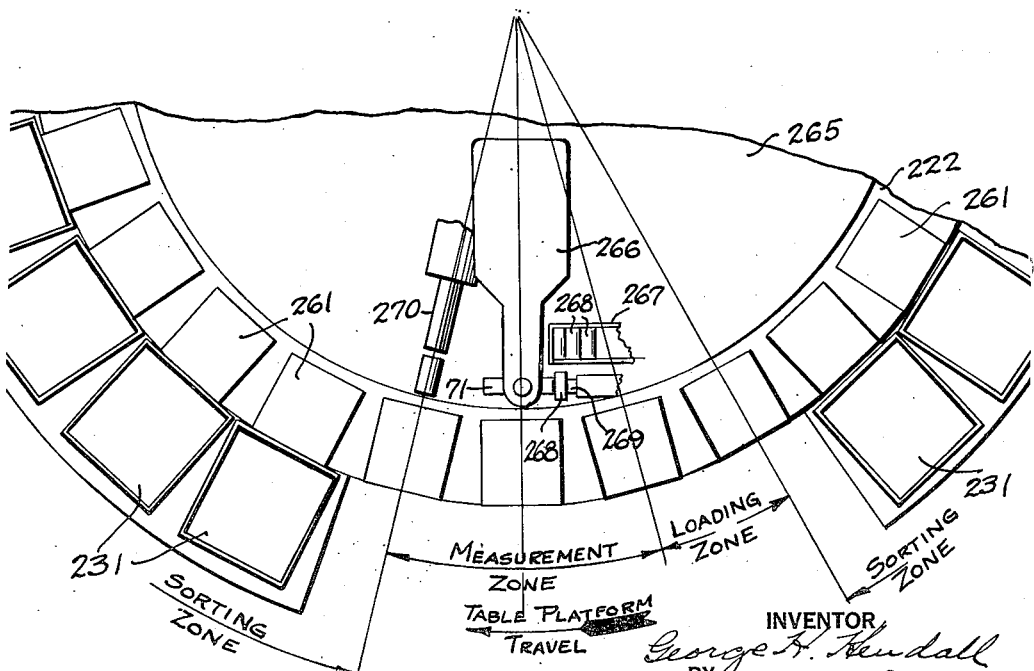
Fig. 55 is a similar view of another form of the table adjacent the gauging head.

In the form shown in Fig. 55, the table or platen 265 is stationary and the gauging head 266 carrying the gauge 71 could be mounted on it having the work pieces fed under the gauging stem 81 through a chute 267 from any suitable hopper, in a similar manner to that shown in Figs. 51 and 52. The work pieces indicated at 268 are shown for example as a small cylindrical piece dropped from the hopper in the front of the gauging head and may be fed under the gauging stem by a solenoid operated plunger 269 and passed by it through under this gauging stem, as indicated in Fig. 28, to a position in front of the ejector plunger 270, which may also be a solenoid operated plunger, both plungers being controlled by the sequence timer 118, and the gauge of course controlling suitable plungers in a selector or measurement signal strip 141 to set up the plungers in the sorting strip 144, to determine into what sorting box or container 231 a piece will be deposited, the gauged piece being shifted by the plunger into one of the sorting platforms 261 which are on a rotatable table 222 and indexed one step at a time between each gauging operation, these sorting platforms 261 operating as previously described to deposit the work piece in the proper container 231.

Fig. 28 shows diagrammatically the flow operation for the various forms, whether the work pieces are shifted to and from the position under the gauging stem by a device such as the solenoid plunger shown, or whether it is carried under the gauging stem by movement of the work holder, as in the various forms shown. It will be understood the automatic gauge 71 is set to measure the part 268 resting upon the work table or holder 265. The intermediate work piece engaging element or arm 273 makes the device effective for rapid precision automatic measurement and extreme accuracy, because as it is located between the work piece and the vertically slidable gauge stem 81 it takes all lateral thrust from the stem as the work piece moves to and from the gauging position, and thus there is no binding of the stem caused by this lateral thrust and it is free to travel up and down in making the measurements, assuring extreme accuracy. The member 273 may be pivoted to the supporting arm 274 at 275, and on the opposite side its free end may operate between adjustable limit stops 277 on the arm 276. To facilitate movement of the work pieces under the gauging means, the under wall may be tapered at 278 leading to the flat accurately ground surface 279 which engages the work piece, this tapered wall guiding the work piece with a minimum of resistance or friction to the gauging position. All measurement signals from the gauge arm 79 are transmitted by the leads in the cable or conduit 251 to the control panel 132, with its selective sorting switches 131, shown in detail in Fig. 13. The leads in the cable or conduit 251a carry the signals from these switches to the measurement signal strip 141, which, through the solenoids 149 mounted in this strip, transmits the signal to the proper plunger in the sorting strip 144, which rotates with the sorting platform or table to operate the proper control switch 149 to cause the gauged work piece to be deposited in the proper container or sorting receptacle, as previously described. The power is timed from the sequence timer 118 in such a way that the lines are "dead" until the gauge hand 79 is at rest after being positioned by the gauging stem 81 according to the work piece being gauged when they are made "alive" by the timer control. This puts minimum wear on the switches and they will last indefinitely.

Automatic measurement and sorting requires full flexibility, permitting sorting of the parts measured into any desired grouping. For example, in the normal run of parts through the machine it might be desired to sort by individual increments in the range of "normal" to "minus 5" and also to sort "plus 5" and "plus 6" for especial requirements. Also all "undersize" parts to be placed in one box and all "oversize" in another box. All these various sorting arrangements and various others not mentioned can be selected by shifting the switches 131, and they may be easily and quickly thrown to the positions for this selective size sorting and group sorting as desired.

Figures 56, 57, 58:
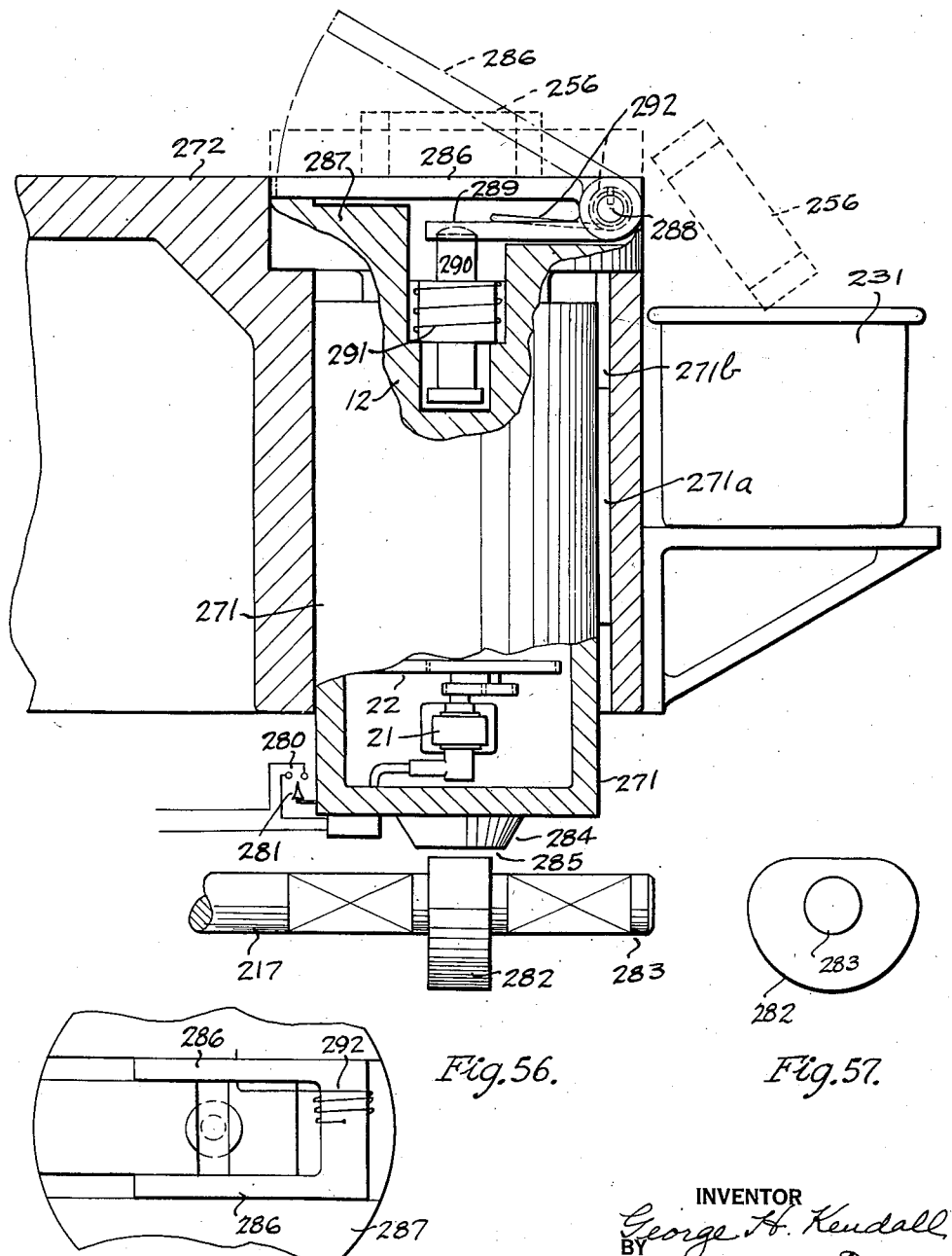
Fig. 56 is a sectional elevational view of one form of work holder and its spindle which may be used for such measurements as internal measurements, eccentricity, out-of-roundness, and so forth.
Fig. 57 is a side view of the cam of Fig. 56.
Fig. 58 is a detail plan view of a portion of the holder of Fig. 56.

If in the device of Figs. 38, 40, 48 and 54, it is desired to employ a rotatable spindle for giving rotary movement to the work piece being gauged, a spindle such as that shown in Fig. 56 could be used, in which the ejector means is mounted as a part of the spindle. This device is designed primarily for making internal measurements of eccentricity, out-of-roundness and the like, and may be used not only for rotative movements but also lifting movements of the work piece so as to permit taking of these internal measurements, but it will be understood that if the work piece does not require rotation or lifting to be gauged, the device could be used without movement of the work support, or it could be raised without rotation, or it could be used with rotation without raising, or a combination of the two, to suit the type of measurement. Such a device greatly increases the general all-purpose feature of the machine, making it adaptable for measuring or gauging a large number of different types or shapes of work pieces. It comprises a vertically slidable sleeve 271 mounted in the rotary table 272, which could be the table 222 of Figs. 40, 48 and 55, or the table 255 of Fig. 54. Mounted to rotate within this sleeve on suitable prestressed ball bearings is a shaft 12 corresponding to the shaft 12 shown in Fig. 5 and operated through a suitable gear motor 21 operating through a reducing drive 22, as shown in Fig. 5, and operated electrically through controls by the sequence timer 118. There could be an automatic auxiliary switch 280 arranged to be closed by a movable contact 281 carried by the sleeve 271 set to start the motor at a given elevation of the sleeve 271 as it is shifted upwardly. It could be set to start the motor to rotate the shaft when the work holder and shaft are lifted to the top of their movement by the cam 282 on the shaft 283 driven from the main drive and adapted to operate on the lug 284 on the bottom of the sleeve 271. It is preferred to leave a clearance 285 between the cam and the lug so that the cam will not interfere with free movement during the indexing operation of the table 272. A key or rib 271a may be provided on one side of sleeve 271 running in a guide groove 271b to prevent the sleeve from turning. A self-contained trip 286 may be mounted in the platen 287 at the top of the shaft and recessed into it as shown, and pivoted to it at 288. This trip includes the lower arm 289 over a plunger 290 of a solenoid 291 controlled by the proper sorting switch 149 which has been previously set by the gauge engaging the work piece carried on this platen in any suitable work holder (not shown) to deposit the work piece indicated in dotted lines at 256 into the proper sorting box 231, as previously described for the sorting operation for various forms of the device.

There may be a light spring 292 (Fig. 58) on the pivot tending to retain the trip in its normal full line position of Figs. 56 and 58.

Figures 49, 50:
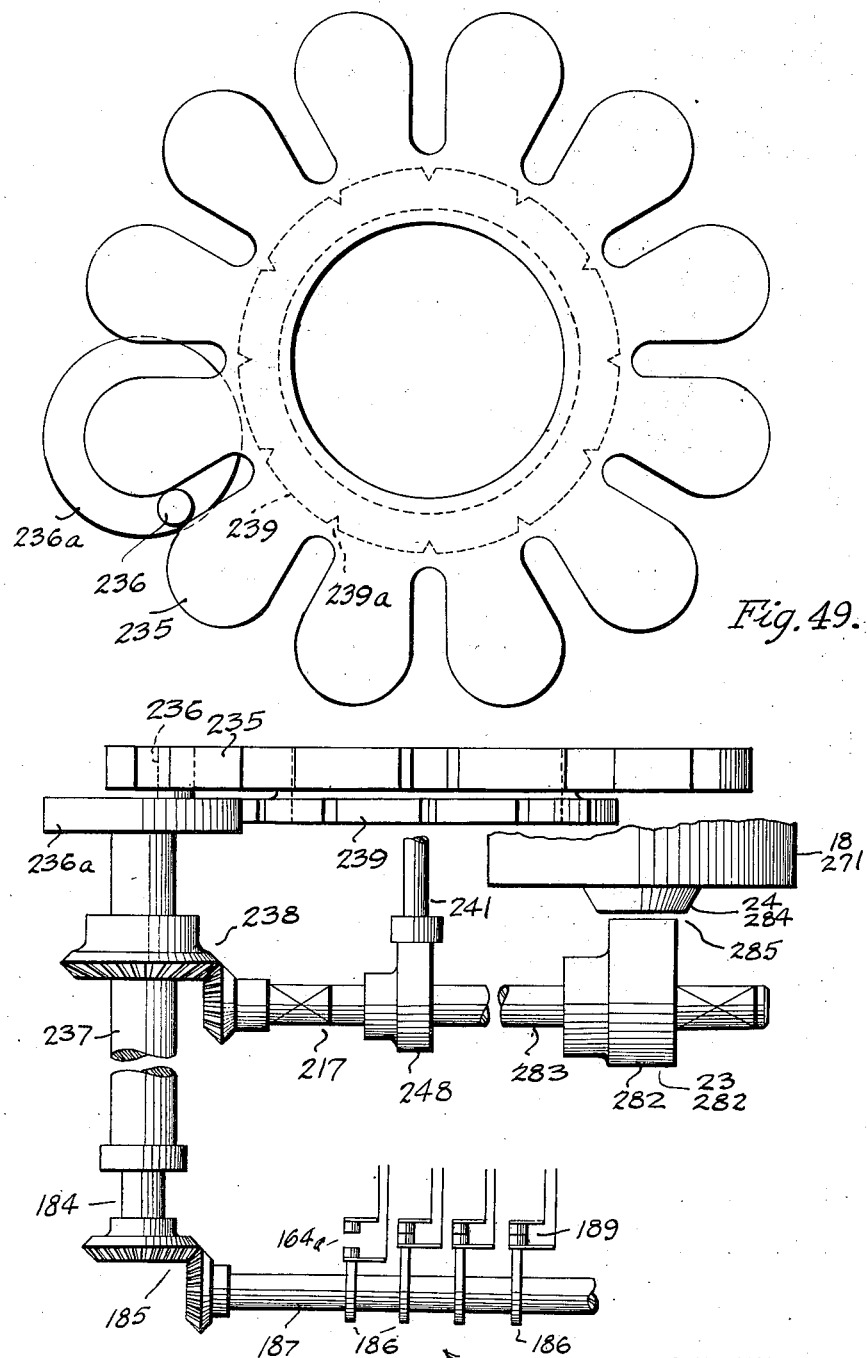
Fig. 49 is a top plan view of the Geneva drive for the feed and sorting table.
Fig. 50 is a side elevation thereof.

A detail of the preferred type of Geneva movement for operating the various gauging or sorting tables, such as shown at 7 (Fig. 4), 94 (Fig. 9) and 235 (Fig. 48) is shown in Figs. 49 and 50, and associated with it and connected so as to rotate with the plate 235 may be a locking device with a plate 239 provided with notches 239a cooperating with a locking pin 160 (Fig. 10) controlled by any suitable means in proper timed relation with the indexing operation, such, for example, as the solenoid 159 controlled from the sequence timer 118. This indexing mechanism, particularly the support 236a for the pin 236 may be driven from the main drive mechanism through suitable gearing 238, as shown in Fig. 48, and it may drive the sequence timer shaft 187 through the gears 185. The cam 248 operating the work spindles 210 of Fig. 48 or shaft 318 (Fig. 59) for axial play measurement, and cam 282 for lifting the sleeve 271 may be mounted on the drive shaft 217 or a shaft driven from the Geneva movement shaft 237, as is found most convenient or desirable. This modified Geneva movement is very suitable for high speed with smooth acceleration and deceleration needed for precision machinery, and works in very well with the electric sequence timer control of all electrical circuits of this machine. It will be understood the Geneva wheel 235 will be provided with the proper number of advancing index positions for the particular device with which it is employed, such as the sorting table of Figs. 3 and 9, or the measuring tables of Figs. 3, 4 and 5, or the combined sorting and measuring tables of Figs. 40, 48, 54 and 55. The pin 236 of the Geneva movement is preferably mounted on a heavy roller bearing (not shown) to provide as nearly frictionless operation and contact with the Geneva wheel as possible to insure best conditions for rapid operation. The bearings on the pin and the Geneva wheel shaft are tight fitting bearings in which no play is noticeable, insuring precision machine accuracy.

In Figs. 59 to 61 are shown details of work holding and operating mechanisms to illustrate other types of measurements which may be performed on this machine, to thus show its flexibility and how it may be a universal machine. This device or fixture in the present illustration is used for measuring the lateral play in such devices as ball bearings. In other words, it is used for measuring internal play within preassembled parts, and a ball bearing is used as an example. The drawing shows the "lateral play" fixture type of work holder for measuring this lateral play within this type of device, such as a ball bearing, the measurement being made on every bearing produced to determine its proper fit classification for proper stock rating, as "tight," "medium," or "loose" fit.

Secured to and depending from the gauge body 71 is a bracket 303 (Fig. 61) having a bearing 304 in which is a vertically slidable sleeve 305 on the lower end of which is mounted a work holder collar 306. A spring 307 tends to shift the sleeve 305 and this collar downwardly, movements of the sleeve being limited by a set screw 308 arranged with its inner end extending into a groove 309 in the external wall of the sleeve. At its upper end the sleeve is connected to a cupped member 310 and in which it may be adjusted for up and down movement and secured in adjusted position by a locking nut 311. In the normal position of the sleeve 305 this member 310 rests on a shoulder 312 at the top of the bearing 304. The sleeve has a longitudinal opening 313 through which the gauge stem 314, corresponding to the gauge stem 81, extends, the stem, however, being elongated so as to bring its lower end to the proper gauging position. On the outer wall of the member 310 is a rack 315 meshing with a gear 316 of a reversible reduction gear motor 317 controlled by a suitable switch in the sequence timer 118.

Mounted below the collar 306, as shown in Fig. 59, and vertically slidable in the platform or gauging table is a shaft or spindle 318 on which is mounted for limited sliding movement a collar 319 below an upper head or flange 320 on the shaft. The collar or sleeve 319 is recessed in its upper end to receive a coil spring 321 reacting against the head or flange 320 to tend to shift the collar 319 downwardly. Pivoted to the upper end of the collar 319 at 322 are jaws 323 for holding tightly the element to be gauged, in this case the outer ring 324 of a ball bearing, against the top surface of the head 320. These jaws 323 may have positioning stops 325 and 326 to engage the side and top walls of the bearing ring to accurately position it on the head of the shaft 318 and also to firmly clamp it in this position. Placed within the upper end of the inner ring 327 of the bearing is a plate 328 which rests on the top edge of this inner ring and has a central boss 329 extending down into the ring a short distance so as to retain this plate on the ring. This plate is immediately below and engages the lower end of the collar 306 which is recessed to receive a coil spring 330 which reacts against the bottom of the recess 328 to tend to force this plate against the ring 327 of the bearing. The spindle or shaft 318 is also recessed at 331 in which is seated a coil spring 332 pressing at its upper end against a bushing or sleeve 333 slidably mounted in the upper end of the recess which engages the under side of the inner bearing ring 327 and preferably has a boss 334 extending a short distance into this ring to insure the ring is held in proper position. The balls of the bearing are indicated at 335. The shaft 318 is given limited vertical sliding movement by a means similar to the cams 23 of Figs. 4 and 5 or the cams 248 and 282 of Figs. 48 and 50, the timing of these cams being controlled automatically with respect to the other operations because their drives are tied up with the drive mechanism of the machine, or operation of the shaft will be controlled from the sequence timer.

In the operation of this device the assembled ball bearings provided with rings 324 and 327 are fed to the head or platen 320 by any suitable feed device at the feed loading station, the spindle 318 and the platen 320 being at this time in their lowermost position. As the spindle is lowered, the lower end 339 of the sleeve 319 engages the top surface of the table 222 and pushes this sleeve upwardly against the action of the spring 321 to loosen or open the clamping jaws 323 sufficiently to permit the assembled ball bearing to be inserted by the feed mechanism to the proper position on the head or platen 320. Then, as the shaft 318 is raised, the spring 321 forces the sleeve 319 downwardly to clamp the jaws 323 tightly against the outer ring 324 of the ball bearing and thus secure it in proper position on the platen 320. As the platen rises the sleeve 333 is pressed by the spring 332 against the lower side of the inner bearing ring 327, but upward movement of this ring is prevented by the plate 329 engaging the lower end of the collar 306 and thus the inner ring 327 of the bearing is held stationary, while the spring 332 is compressed and the outer ring 324 is raised as far as it will be permitted by the lateral play in the ball bearing between the inner and outer rings 327 and 324, which is shown exaggerated in Fig. 59 and is illustrated by the balls 335 being shown against the top of the groove or raceway in the inner ring 327 and against the lower side of the groove or raceway in the outer ring 324. This takes up all lateral or internal play of the ball bearing at which position the work station spindle 318 remains. The collar 306 and the gauge stem 314 were preset to "zero" or "normal" on the gauge dial by the adjustment at 311 before this raising movement of the spindle 318 to provide a common "zero" point for measuring all bearings without other setting. The heavy spring 307 keeps the collar 306 in the "down" position as set to "normal" or "zero" of the gauge stem. This is of importance as making possible the measurement of the play within pre-assembled parts in continuous mass automatic measurement. The machine provides flexible control to assure accurate readings of the lateral play with all variables after this lateral play has been taken up in the manner specified and the parts are in the position of Figs. 59 and 61. The collar 306 is changed to suit each job so as to be adapted to the work to be gauged. The gear motor 317 is operated at proper timing from the sequence timer 118 and through the gear 316 raises the member 310, the sleeve 305 and the collar 306. As these parts move upwardly the spring 332 moves the bushing or sleeve 333 upwardly carrying with it the inner bearing ring 327 and the plate 328, maintaining this plate against the lower end of the collar 306. This, therefore, shifts the inner ring 327 of the ball bearing through the lateral play in the bearing to a position shown in Fig. 60, in which the balls are against the upper side of the groove or raceway in the outer bearing ring 324 and against the lower side of the groove or raceway in the inner bearing ring 327. This movement, therefore, is the lateral play between the two rings of the bearing, and as the plate 328 moves upwardly with the inner ring 327 it moves the gauging stem 314 upwardly a corresponding amount which is transmitted to the gauge arm 79 and therefore gives a measurement of the lateral play in the bearing. This setting or movement of the arm gives the proper signal through the control panel 132 to the solenoids in the measurement signal strip 141 to set the proper pin 145 in the sorting strip 144 to operate the proper sorting switch 149 of the work table as indexed, to deposit the gauged ball bearing in the proper work receptacle or container 231 or 102, as previously described. Before this, however, it will be understood that after the signal is properly sent and recorded on the sorting strip 144, the spindle 318 is lowered to release the ball bearing so that it may be shifted laterally by suitable ejecting means.

If preferred, instead of using the gear motor 317 and the gear and rack 316 and 310 to shift the sleeve 305 and the collar 306, they may be shifted by a cam, as shown in Fig. 62, in which a plate 337 is fastened to the top of the member 310 and overhangs a cam 338 at one side driven from the drive mechanism through any suitable means, such as a shaft 339 through suitable gears 340; or if it is desired to impart rotating movement to the upper collar 306 this may be done as shown in Fig. 63 by providing a gear 341 on the top of the member 310 and meshing with a driving pinion 342 driven by shaft 343 from the gearing 340. For special work pieces there may be a gear 346 on shaft 339 for operating a feed mechanism to feed the pieces, such as ball bearings, to gauging position. As shown in these figures and Fig. 39, the sleeve 305 may be mounted in a bracket 344 secured on a boss 345 on the inner side of one of the upright arms of the head frame 250.

It will be seen from the above description that the machine can be made as a general purpose machine to gauge and sort all kinds of work pieces. Also, that by setting the switches in the switch selector panel 132, the pieces can be sorted into any desired groups of determined sizes or characteristics, or within certain tolerances or limits.

Having thus set forth the nature of my invention, I claim:

1. A measuring machine of the character described comprising a gauging means for measuring work pieces and including a movable element positioned according to a dimension of the work piece, means for moving work pieces to and from the gauging means, a plurality of electric circuits controlled by said movable element, a plurality of trip means, an electrical means for operating each trip means, a plurality of hand operated switches each including a movable contact connected with one of the circuits from the gauging means and a plurality of contacts each connected to a trip operating means coacting with the movable contact, said movable contact adapted to connect said circuit with any one of a plurality of the trip operating means, a plurality of work receiving means, and means associated with each receiving means adapted to cooperate with a given set trip to deposit the corresponding work piece in said receiving means.

2. A measuring machine of the character described comprising a gauging means for measuring work pieces and including a plurality of insulated segments, an electric circuit leading from each segment, a movable element adapted to contact each segment and close a circuit therethrough, means for positioning said element according to a dimension of a work piece being gauged, sorting means for the gauged work pieces including a series of trip means, an electrical operating means for each trip, a series of selective hand switches each including a movable contact connected to one of the circuits from the gauge segments and a plurality of contacts each connected to a trip operating means coacting with the movable contact, said movable contact adapted to be shifted to connect said circuit with any one of a plurality of the trip operating means, and sorting means for the gauged work pieces controlled by the trip means.

3. A measuring machine of the character described comprising a gauging means for measuring work pieces and including a plurality of insulated segments, an electric circuit leading from each segment, a movable element adapted to contact each segment and close a circuit therethrough, means for positioning said element according to a dimension of a work piece being gauged, means for moving work pieces in succession to and from gauging position, sorting means for the gauged work pieces including a series of trip means, an electrical operating means for each trip means, a series of selective hand switches each including a movable contact connected to one of the circuits from the gauge segments and a series of contacts each connected to a trip operating means cooperating therewith, said movable contact adapted to be shifted to connect said circuit with any one of a plurality of trip operating means, means for connecting said circuits with a source of current supply, a sequence timer adapted to control said circuits so as to connect them with the current supply only after said gauging element has been positioned by gauging a work piece, means for operating the sequence timer in definite timed relation with movement of the work pieces, and sorting means for the gauged work pieces controlled by the trip means.

4. A measuring machine of the character described comprising a gauging device comprising a movable member, a vertically movable gauging stem, means connecting the stem with the member to position it, a horizontally pivoted member under the stem provided with a surface on its top wall engaged by said stem and a surface on its under side to engage work pieces being gauged to position the stem, means for moving work pieces to and from a gauging position under said surface comprising a rotatable table, a series of separate work holding stations on the table, means for indexing the table with a step-by-step movement to carry the stations in succession to the gauging means and holding the table stationary between successive indexing operations to hold it stationary during the gauging operation, and means responsive to different positions of the movable member for sorting the gauged work pieces.

5. A measuring machine of the character described comprising a gauging device including a movable member, a vertically movable gauging stem connected with said member for positioning it, guiding means in which the stem slides, means under the lower end of the stem for supporting a work piece in gauging position comprising a rotatable table, a series of separate work holding stations on the table, means for indexing the table with a step-by-step movement to carry the stations in succession to the gauging means and holding the table stationary between successive indexing operations to hold it stationary during the gauging operation, an intermediate member between the stem and a work piece on said supporting means and provided with a top surface engaged by said stem and a flat horizontal surface on its under side to engage the work piece, means for pivotally mounting the intermediate member at one side of the stem, means for feeding work pieces horizontally to and from gauging position under said latter surface, and sorting means responsive to various positions of the movable member for sorting gauged work pieces according to dimensions of said work pieces.

6. A gauging machine of the character described comprising a gauging means for measuring pieces, a rotatable measuring table, means for indexing the table with a step by step movement, a plurality of work holding stations on the table movable in succession to and from said gauging means and held stationary during the gauging operation, work holding means in each station, an upright spindle on which each work holding means is mounted, means for rotating the spindle and a work piece thereon one revolution while the station is held stationary during the gauging operation, a sequence timer operated in timed relation with the measuring table to control operation of said spindle, and sorting means for the gauged work pieces controlled by said gauging means.

7. A gauging machine of the character described comprising a rotatable measuring table, means for indexing the table with a step by step movement, a gauging means for measuring work pieces, a plurality of work holding stations on the table movable by said indexing movement to and from the gauging means and held stationary in gauging position, and upright spindles mounted in the table and movable therewith to and from the gauging means, a work holder mounted on each spindle, means for rotating the spindle one revolution while its station is held stationary in the gauging position to thus rotate a work piece in the holder, means operated in timed relation with movement of the table to control rotation of the spindle, and sorting means for gauged work pieces controlled by said gauging means.

8. A gauging machine of the character described comprising a rotatable measuring table, means for indexing the table with a step by step movement and holding it stationary between said movements, a gauging means for measuring work pieces, a plurality of work holding stations on the table comprising upright spindles mounted for vertical sliding movement in the table and movable with the table to and from the gauging means, a work holder mounted on each spindle, means for turning the spindle while its station is held stationary in gauging position, means for sliding the spindles vertically while in this position, means operated in timed relation with movement of the table to control the spindle turning and sliding means, and sorting means for gauged work pieces controlled by said gauging means.

9. A gauging machine of the character described comprising a rotatable measuring table, means for indexing the table with a step by step movement and holding it stationary between such movements, a gauging means for measuring work pieces, a plurality of work holding stations on the table comprising work holders mounted on the table for up and down movement and movable with the table to and from the gauging means, means for moving each work holder vertically while its station is held stationary in the gauging position, means operated in timed relation with movement of the table controlling movement of the work holders, and sorting means for gauged work pieces controlled by the gauging means.

10. A gauging machine of the character described comprising a rotatable measuring table, means for indexing the table, a gauging means, a series of vertically slidable sleeves mounted in the table, a work spindle mounted in bearings in each sleeve, a work holder on each spindle movable with the table to and from the gauging means, a gear motor drive for each spindle, means for shifting the sleeve vertically to shift a work piece on the holder relative to the gauging means, means operated in timed relation with the table controlling operation of the gear motor and shifting of the sleeve, and sorting means for gauged work pieces controlled by the gauging means.

11. A gauging machine of the character described comprising a rotatable measuring table, a rotatable sorting table, means for indexing the tables in certain timed relation, a gauging means associated with the measuring table, a series of vertically slidable sleeves mounted in the measuring table, a work spindle mounted in bearings in each sleeve, a work holder on each spindle movable with the measuring table to and from the gauging means, means for rotating each spindle at the gauging position, means for shifting each sleeve to shift the work piece on its spindle relative to the gauging means, a series of work receiving means on the sorting table, means for transferring gauged work pieces from the measuring table to the sorting table, means operated in timed relation with movement of the tables controlling operation of the spindle rotating means, the sleeve shifting means and the work transfer means, and sorting means for work pieces on the sorting table controlled by the gauging means.

12. A gauging machine of the character described comprising a rotatable measuring table, a rotatable sorting table, means for indexing the tables in certain timed relation, a gauging means associated with the measuring table, a series of vertically slidable sleeves mounted in the measuring table, a work spindle mounted in bearings in each sleeve, a work holder on each spindle movable with the measuring table to and from the gauging means, means for rotating each spindle at the gauging position, means for shifting each sleeve to shift the work piece on its spindle relative to the gauging means, a series of pivoted sorting platforms on the sorting table, means for transferring gauged work pieces from the work holders to the sorting platforms, means operated in timed relation with movement of the tables controlling operation of the spindle rotating means, the sleeve shifting means and the work transfer means, and means controlled by the gauging means for causing operation of the sorting platforms to discharge the work piece on individual platforms at a given location of said platform.

13. A measuring machine of the character described comprising a gauging device including a plurality of insulated contacts, a circuit connection to each contact, a movable member carrying a contact to move in succession over the first contacts, a gauging stem positioned by work to be gauged and connected with said movable contact, a work holding station movable to and from the gauging device, means for holding the stations stationary during the gauging operation, each station comprising a work holder associated with said gauging device for holding work to be gauged, means for rotating said holder to rotate the work while the station is held stationary in the gauging position, an increment counter connected with the stationary contact circuits including means to shift a contact a step for each contact engaged by the movable contact, a series of circuits controlled by the counter contact, and sorting means for the gauged work pieces controlled by said latter circuits.

14. A gauging machine of the character described comprising a gauging device including a plurality of stationary contacts, a movable contact movable in succession over the stationary contacts, means for engaging a work piece and connected with the movable contact to position it according to characteristics of the work piece, means for shifting work to and from the gauging device comprising a rotatable table provided with a plurality of work holding stations, means for indexing the table with a step by step movement to bring the stations successively to the gauging means and holding them stationary during the gauging operation, a work holder in each station, means for operating the work holder to move a work piece therein relative to the work engaging means while the station is stationary in the gauging position, an increment counter electrically connected with the stationary contacts including means to shift a contact one step for each contact engaged by the movable contact, a plurality of circuits controlled by the counter contact, and sorting means for gauged work pieces controlled by the latter circuits.

15. A gauging machine of the character described comprising a gauging device including a plurality of stationary contacts, a movable contact movable in succession over the stationary contacts, means for engaging a work piece and connected with the movable contact to position it according to characteristics of the work piece, a rotatable table, a series of spindles mounted for vertical sliding movement in the table, a work holder carried by each spindle, means for indexing the table to move the holders in succession to and from the gauging means, means for turning the spindles while in gauging position, an increment counter electrically connected with the stationary contacts including means to shift a contact one step for each contact engaged by the movable contact, a plurality of circuits controlled by the counter contact, and sorting means for gauged work pieces controlled by the latter circuits.

16. A gauging machine of the character described comprising a gauging device including a plurality of stationary contacts, a movable contact movable in succession over the stationary contacts, means for engaging a work piece and connected with the movable contact to position it according to characteristics of the work piece, a rotatable table, a series of spindles mounted for vertical sliding movement in the table, a work holder carried by each spindle, means for indexing the table to move the holders in succession to and from the gauging means, an increment counter electrically connected with the stationary contacts including means to shift a contact one step for each contact engaged by the movable contact, means for turning the spindles and sliding them vertically at the gauging position in certain timed relation with movement of the table, a plurality of circuits controlled by the counter contact, and sorting means for gauged work pieces controlled by the latter circuits.

17. A gauging machine of the character described comprising a work holding station including a rotatably mounted work holder, a gauging device comprising a plurality of stationary contacts, a movable contact adapted to move in succession over the stationary contacts, a feeler member adapted to engage a work piece in the holder and connected with the movable contact to shift it according to variations in the surface engaged by said feeler, means for shifting the work holding station to a gauging position and holding it stationary during the gauging operation, means for turning the work holder and work piece in the said station while the station is held stationary in gauging position, means for counting the number of stationary contacts engaged by the movable contact during said turning movement, and a series of circuits controlled by said counting means.

18. A gauging machine of the character described comprising a rotatable work table, a plurality of work holding stations comprising rotatable work holders mounted on said table, a gauging device including a plurality of stationary contacts, a movable contact movable over the stationary contacts in succession, a feeler member adapted to engage the surface of a work piece on the work holder and connected with the movable contact to shift it in accordance with variations in said surface, means for indexing the table with a step by step movement to move the work holding stations to and from the gauging position and hold them stationary therein, means for turning the work holders to turn the work pieces at the gauging position in timed relation to the indexing of the table and while the holding stations are stationary, means for counting the number of stationary contacts engaged by the movable contact during a turning movement of the work piece, and a series of circuits controlled by said counting means.

19. A measuring machine of the character described comprising a rotatable table, a series of platforms hinged to the table to swing their outer edges downwardly, an upright spindle mounted in each platform, a work holder carried by each spindle, a series of receiving means positioned about the table outwardly of said platforms, a gauging device, means for indexing the table to move the work holders to and from the gauging device, means for turning the spindles when in gauging position and in timed relation with indexing of the table, means for tipping each platform to discharge the work piece therefrom, means associated with each receiving means to operate a given platform, and means controlled by the gauging means for selecting the platform operating means to tip the platform at a given receiving means.

20. A measuring machine of the character described comprising a rotatable table, a series of platforms hinged to the table to swing their outer edges downwardly, a sleeve mounted in each platform for vertical sliding movement, a spindle mounted in bearings in each sleeve, a work holder carried by each spindle, a gauging device, means for indexing the table to move the work holders to and from the gauging device, means operated in timed relation with movement of the table to turn the spindle and slide the sleeve at the gauging position, a series of receiving means positioned about the table, means associated with each receiving means to tip the platforms, and means controlled by the gauging means to control operation of the platform tipping means.

GEORGE H. KENDALL.

REFERENCES CITED

The following references are of record in the file of this patent:

UNITED STATES PATENTS

| Number | Name | Date |
|---|---|---|
| 1,234,433 | Winkley | July 24, 1917 |
| 1,243,260 | Clarke | Oct. 16, 1917 |
| 1,294,740 | Winkley | Feb. 18, 1919 |
| 1,396,221 | Ladd | Nov. 8, 1921 |
| 1,550,671 | Brault | Aug. 25, 1925 |
| 1,586,156 | Keller | May 25, 1926 |
| 2,085,671 | Powers | June 29, 1937 |
| 2,171,666 | Menzel | Sept. 5, 1939 |
| 2,318,856 | Hoffman | May 11, 1943 |
| 2,319,833 | Troy | May 25, 1943 |
| 2,338,868 | Owens | Jan. 11, 1944 |
| 2,376,372 | Martinec | May 22, 1945 |
| 2,390,012 | Timm | Nov. 27, 1945 |
| 2,419,280 | Neff | Apr. 22, 1947 |